(12) United States Patent
Karafin et al.

(10) Patent No.: US 11,927,915 B2
(45) Date of Patent: Mar. 12, 2024

(54) ENERGY MODULATION SYSTEMS FOR DIFFRACTION BASED HOLOGRAPHIC DISPLAYS

(71) Applicant: Light Field Lab, Inc., San Jose, CA (US)

(72) Inventors: Jonathan Sean Karafin, San Jose, CA (US); Charles C. Yang, San Jose, CA (US); Brendan Elwood Bevensee, San Jose, CA (US)

(73) Assignee: Light Field Lab, Inc., San Jose, CA (US)

( * ) Notice: Subject to any disclaimer, the term of this patent is extended or adjusted under 35 U.S.C. 154(b) by 0 days.

(21) Appl. No.: 17/990,258

(22) Filed: Nov. 18, 2022

(65) Prior Publication Data
US 2023/0185237 A1    Jun. 15, 2023

Related U.S. Application Data

(63) Continuation of application No. PCT/US2021/058499, filed on Nov. 9, 2021.

(51) Int. Cl.
*G03H 1/10* (2006.01)
*G03H 1/04* (2006.01)
*G03H 1/22* (2006.01)

(52) U.S. Cl.
CPC .......... *G03H 1/10* (2013.01); *G03H 1/0443* (2013.01); *G03H 1/2294* (2013.01); *G03H 2225/13* (2013.01)

(58) Field of Classification Search
CPC ...... G03H 1/0866; G03H 1/04; G03H 1/0443; G03H 1/10; G03H 1/2294; G03H 1/22; G03H 1/2202; G03H 2225/13; G03H 2225/30; G03H 2225/33; G03H 2225/34
USPC ..................................................... 359/1, 9, 11
See application file for complete search history.

(56) References Cited

U.S. PATENT DOCUMENTS

| | | | |
|---|---|---|---|
| 6,847,420 | B2 | 1/2005 | Lazarev et al. |
| 10,416,762 | B2 | 9/2019 | Kim et al. |
| 10,488,822 | B2 | 11/2019 | Kim et al. |
| 2009/0303313 | A1 | 12/2009 | Yukich |

(Continued)

FOREIGN PATENT DOCUMENTS

EP    3196043 A1 *    7/2017    ............. B42D 25/30

OTHER PUBLICATIONS

Chen et al., "Liquid metal metasurface for flexible beamsteering.", Optics Express 27 (16):23282-23292, 2019. [retrieved on Sep. 2, 2022]. Retrieved from the Internet.

(Continued)

*Primary Examiner* — Stephone B Allen
*Assistant Examiner* — Jyotsna V Dabbi
(74) *Attorney, Agent, or Firm* — Charles C. Yang

(57) ABSTRACT

A holographic energy system is operable to generate an output wavefront according to a complex amplitude function. The holographic energy system includes a continuous three-dimensional energy medium, an array of energy devices configured to output energy to interact with the continuous three-dimensional energy medium to define a hologram therein, and an electromagnetic (EM) energy source positioned to output coherent EM energy that is incident on the hologram in the continuous three-dimensional energy medium to generate an output wavefront.

25 Claims, 16 Drawing Sheets

(56) References Cited

U.S. PATENT DOCUMENTS

2011/0249087 A1 10/2011 Tsang et al.
2014/0375763 A1 12/2014 Lee et al.

OTHER PUBLICATIONS

Hernandez. Design and characterization of hybrid polymeric materials based on PE-b-PEO block copolymer. 2017. [retrieved on Sep. 2, 2022]. Retrieved from the Internet.
International Search Report and Written Opinion of PCT/US2021/058499 dated Mar. 10, 2022.
Jain et al., "An Overview of Polymer-Dispersed Liquid Crystals Composite Films and their Applications.", Liquid Crystals and Display Technology. 2020. [retrieved on Sep. 2, 2022]. Retrieved from the Internet.
Shalaginov et al., "Design for quality: reconfigurable flat optics based on active metasurfaces.", Nanophotonics 9 (11): 3505-3534, 2020. (retrieved on Sep. 2, 2022). Retrieved from the Internet.

* cited by examiner

| SOUCRE OF PHOTOGRAPHIC FILMS | RESOLVING POWER (LINE PAIRS/mm) | GRAIN SIZE (mm) |
|---|---|---|
| COLOUR HOLOGRAPHIC | 4000 | 20-25 |
| STAVICH | 5000 | 10 |
| SFERA-S | 6000 | 9 |
| ULTIMATE | 10000 | 8 |

| CODING | DIFFRACTION EFFICIENCY |
|---|---|
| BINARY | 6.61% |
| IDEAL AMPLITUDE 8 | 3.87% |
| IDEAL AMPLITUDE 8 DISPLAYED ON $2\pi$ SPIRAL TN-SLM | 28.61% |
| IDEAL AMPLITUDE 8 DISPLAYED ON TN-SLM | 4.71% |
| IDEAL $2\pi$ SPIRAL 8 | 10.95% |
| SPIRAL 8 ON OUR SVGA TN-SLM | 3.00% |

# ENERGY MODULATION SYSTEMS FOR DIFFRACTION BASED HOLOGRAPHIC DISPLAYS

TECHNICAL FIELD

This disclosure is related to holograms and more specifically to holographic displays that modulate energy according to diffraction principles.

BACKGROUND

Holography is a technique that enables an energy field, such as a light field, to be recorded and later reconstructed when the original energy field is no longer present, due to the absence of the original objects. Holography can be thought of as somewhat similar to sound recording, whereby a sound field created by vibrating matter like musical instruments or vocal cords, is encoded in such a way that it can be reproduced later, without the presence of the original vibrating matter.

In conventional optical holography, holograms have been recorded in photosensitive films as reflection holograms and transmission holograms. Both types of film-based holograms are operable to modulate the amplitude and phase of light passing through to reconstruct an image of a real object. Reflection holograms are recorded as an interference pattern and are operable to form a light field as the light used for reconstruction reflects from the interference pattern. Transmission holograms form a light field as light diffracts through the hologram during reconstruction.

Recent applications of holography principles have extended to holographic displays. Diffraction-based holographic displays are known in the art to rely on a spatial light modulator to modulate light. For example, U.S. Pat. No. 10,416,762 describes a holographic display apparatus that includes a spatial light modulator ("SLM") configured to reproduce a hologram image by diffracting incident light. Another example is U.S. Pat. No. 10,488,822. Holographic displays that rely on an SLM to produce a hologram image are limited in performance by the pixilation and two-dimensionality of the SLM.

SUMMARY

According to an example of the present disclosure, a holographic energy system may include a continuous three-dimensional energy medium, an array of energy devices configured to output first energy operable to modify the continuous three-dimensional energy medium to define a hologram therein, an EM energy source operable to output coherent EM energy to the continuous three-dimensional energy medium, and a controller operable to provide an instruction to the array of energy devices so that the hologram defined in the continuous three-dimensional energy medium modulates the coherent EM energy according to a complex amplitude function to generate a wavefront having a complex amplitude. In an embodiment, the controller is further operable to dynamically update the instruction to the array of energy devices to update the hologram defined in the continuous three-dimensional energy medium to modulate the coherent EM Energy according to an updated complex amplitude function to generate a dynamically updated wavefront.

DETAILED DESCRIPTION

An observer perceives an object when it reflects, scatters or radiates energy waves, such as light and sound waves, that can be sensed by observer. Energy as a wave has amplitude and phase that can be modulated spatially by a medium. For example, a true hologram can modulate both the amplitude and phase according a complex amplitude function.

Figure 1A:
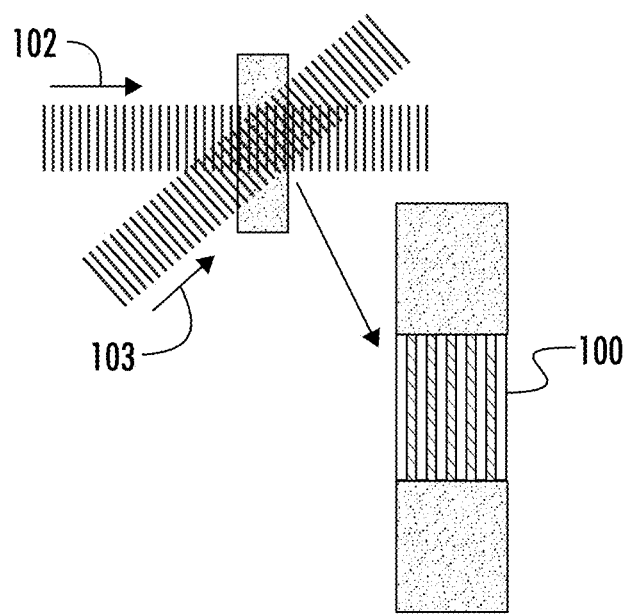
FIG. 1A illustrates the interference of an object wave and a reference wave.

FIG. 1A illustrates the interference of an object wave 102 and a reference wave 103 in a medium 100. In conventional optical recording of holograms, a wavefront originating from one or more physical objects and propagating in the object wave interacts with a reference wavefront propagating in a reference wave, thereby creating an interference pattern. The interference pattern of the two wavefronts may be considered as may be recorded optically in a recording medium 100 which would be able modulate light passing through according to a complex amplitude function. In other words, the hologram recording captures a representation of the complex optical field distribution and is operable to produce a light field according a complex amplitude function. In the replay of recorded holograms, the recorded hologram would be able to modulate a replay reference wave to result in a signal wave that reproduces the wavefront in the original object wave. The choice of replay reference wave can depend on the type of hologram being reconstructed as well as the choice of reference wave used during the recording process.

In contrast to the approach of conventional optical hologram recording, in which\a hologram is generated based on a wavefront from one or more physical objects, the approach of a computer generated hologram ("CGH") generates a hologram computationally without the wavefront from a physical object and encode the computationally determined hologram in a physical medium, such as the pixels of a two dimensional (2D) spatial light modulator ("SLM").

Optical Recording in Films

Figure 1B:
FIG. 1B is an example of a high-quality film-based hologram.
Figures 1C, 1D:
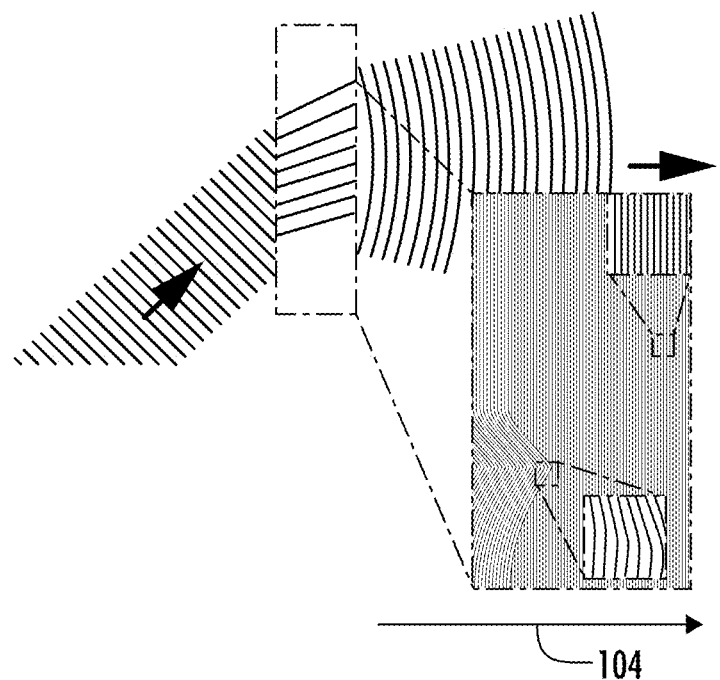
FIG. 1C is a table illustrating the grain size of various material used for film-based holograms and the corresponding resolution.
FIG. 1D is an illustration of a close-up view of the fringes pattern in a depth direction.

Optically recording in a film-based hologram can allow for a high-quality light field. FIG. 1B is an example of a high-quality film-based hologram. There are several factors that can contribute to a high quality film-based hologram. One factor is the material used to record the hologram. Holograms like the one shown in FIG. 1B have an interference pattern encoded in a fine-grain emulsion with grain size on the scale of nanometers. FIG. 1C is a table illustrating the grain size of various material used for film-based holograms and the corresponding resolution. The film grain size being on the scale of nanometers allows the hologram to be recorded and replayed with high precision and resolution.

Figure 1E:
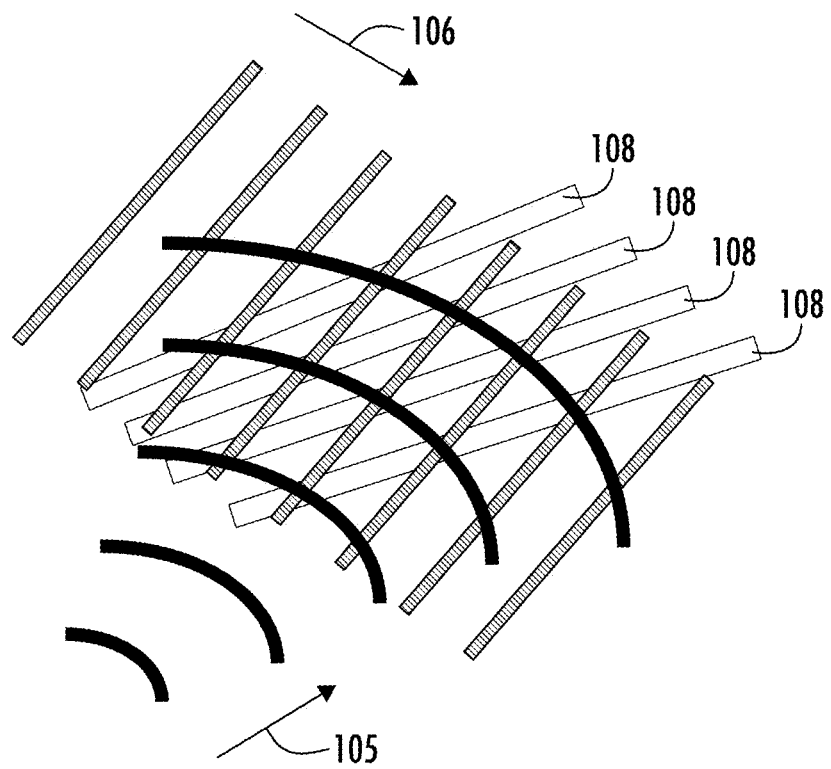
FIG. 1E is a schematic diagram of an object wave and a reference wave forming multiple planes of interference.

Another factor contributing to the high quality of some film-based holograms is the recording volume being a three-dimensional volume. A three-dimensional volume, given enough depth, can record multiple planes of interference so that accurate interference information in the depth dimension is retained and do not have to be approximated somehow. FIG. 1D is an illustration of a close-up view of the fringes pattern in a depth direction 104 that is perpendicular to the surface of the recording material receiving the incoming wavefront. FIG. 1E is a schematic diagram of an object wave 105 and a reference wave 106 forming an interference pattern. The interference pattern has multiple planes 108 of interference spanning a three-dimensional volume that can be accurately recorded if the recording material also spans in a three-dimensional volume sufficiently.

The combination of nano-scale grain size and the ability to record a three-dimensional fringe pattern allows some film-based holograms to allow reconstruction of an accurate wavefront and the features of a true hologram, such as intensity, reflection, refraction, transparency, dynamic range, etc.

Pixelated Dynamic Modulation

Figure 2:
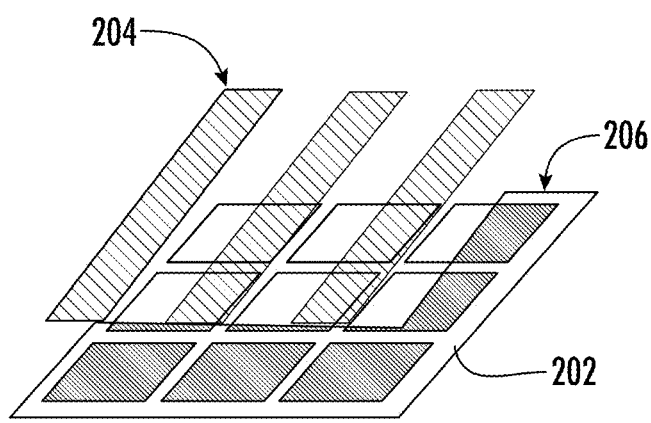
FIG. 2 illustrates a digitized approach to encoding a hologram.

While film-based holograms allow for high quality recording and reconstruction of a light field, it does not allow for dynamic updating and refreshing of the hologram. In contrast, CGH can be used to modulate light to produce wavefronts corresponding to real-time, dynamic images of objects that never physically existed. FIG. 2 is an illustration of a conventional 2D pixel plane 202 that may be encoded with an interference pattern 204 to modulate the phase or amplitude of light energy passing therethrough to present desired a light field comprising a digital scene. The 2D pixel plane 202 of FIG. 2 illustrates a digitized approach to encoding a hologram with certain limitations due to the physical structure of the pixels.

As shown in the FIG. 2, the pixel plane 202 provides only a single plane of interference as compared to a volume of interference pattern in a film-based hologram. Additionally, the pixel plane 202 has non-functioning spaces between the pixels that are illuminated to varying degrees. The illuminated dead areas 206 add unmodulated light and causes undesirable artifacts and aberrations. Even if unilluminated, the dead areas limit the diffractive field of view.

Figure 3A:
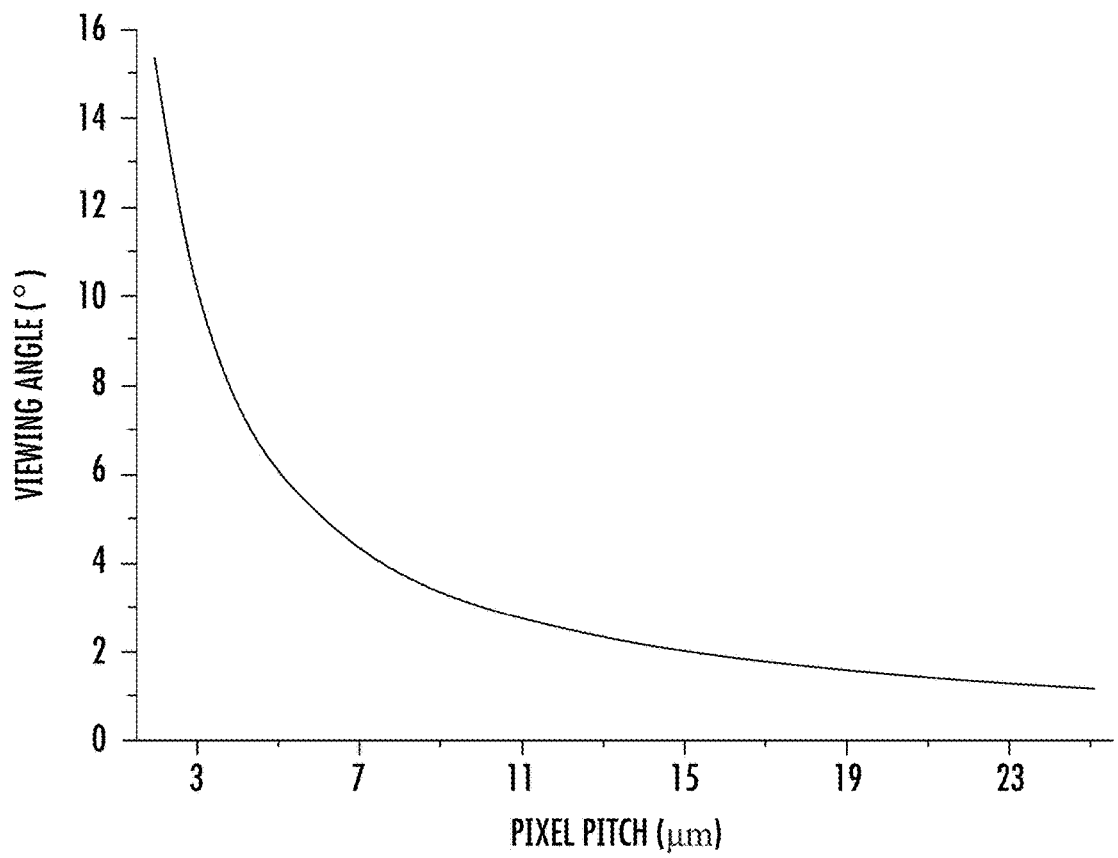
FIG. 3A shows the relationship of pixel pitch of a display and the viewing angle of the display.
Figure 3B:
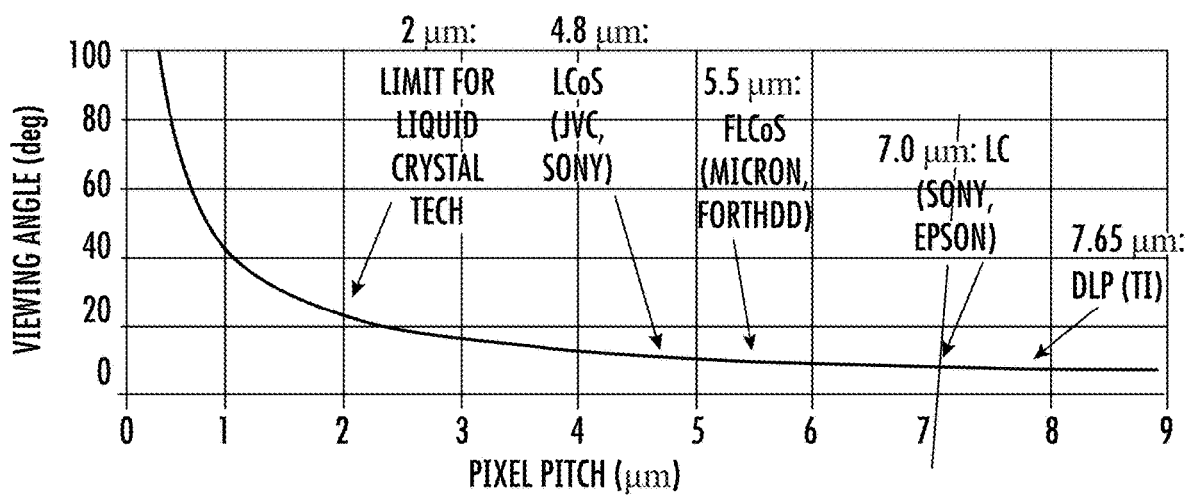
FIG. 3B shows the limits of pixel pitch in conventional digital energy modulation devices, such liquid crystal displays.
Figure 3C:
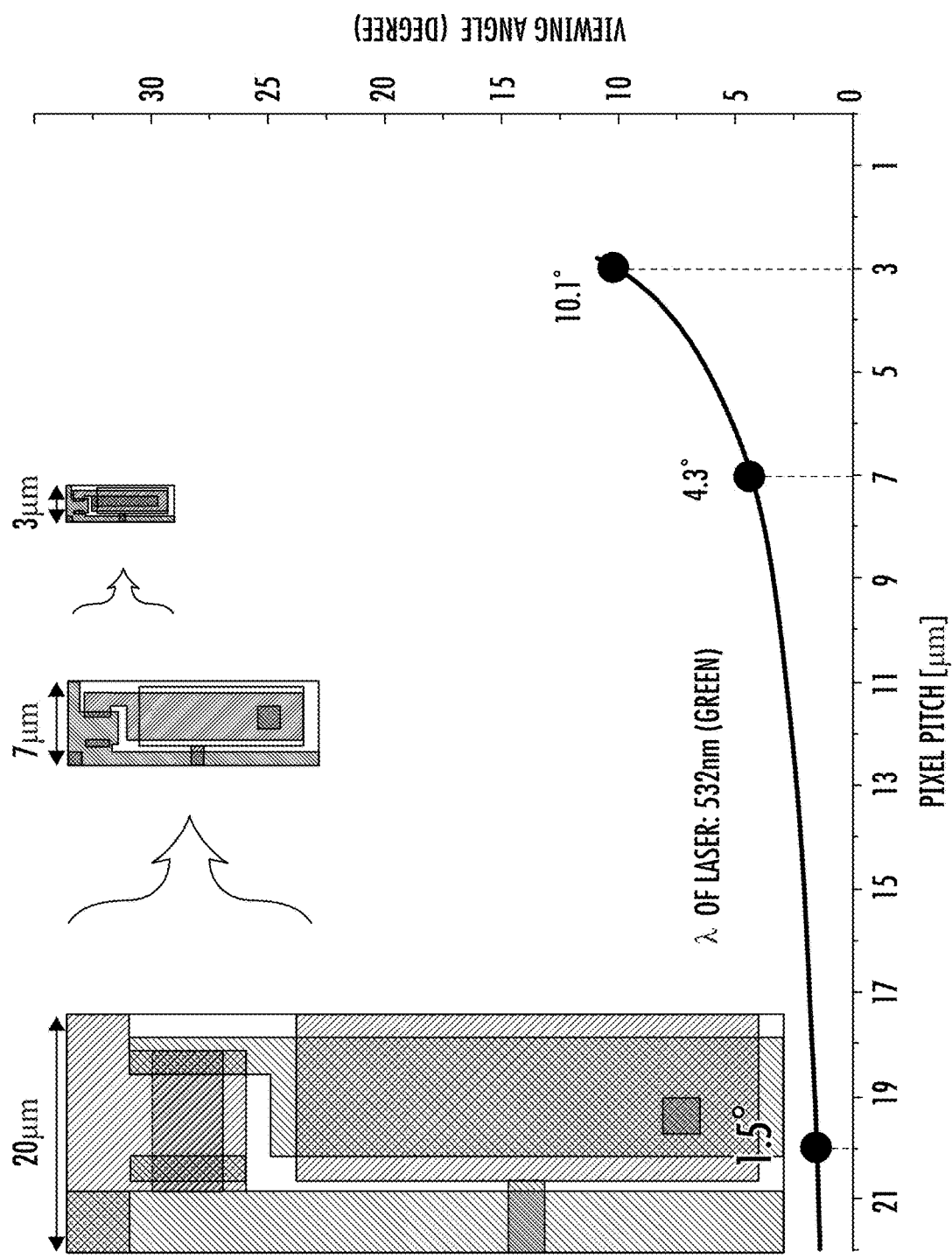
FIG. 3C is a diagram showing pixel pitch allowed by the current state of the art electronics.

Because the smallest effective pixel size that a "fringe output" display can deliver is linked to its maximum available diffraction angle, holographic displays need to provide an effective pixel size on the order of the wavelength of the illumination light in order to deliver a convincing holographic image with viewing angle suitable to direct viewing. However, the current state of the art display technology is nowhere near this pixel pitch requirement. FIG. 3A shows the relationship of pixel pitch of a display and the viewing angle of the display and FIG. 3B shows the limits of pixel pitch in conventional digital energy modulation devices, such liquid crystal displays. As shown in these diagrams, the current state of the art for digital displays has a limitation on pixel pitch at around 2 microns, which provides a corresponding viewing angle of around 20 degrees. Furthermore, even if the energy modulation component (e.g., liquid crystal cell) of the state of the art for digital displays may be reduced beyond 2 microns, the size of the electronics driving the pixels would be another bottleneck for reducing pixel pitch. FIG. 3C is a diagram showing a reduction in electronic components to allow the pixel pitch to be reduced to the current state of the art pixel pitch of 2-3 microns, but how to achieve further reduction in the electronics components to allow for small pixel pitch is still currently not known. The limitation on the pixel pitch is one reason the current state of the art digital displays cannot even come close to producing a hologram with quality that are comparable to a film-based hologram.

Figures 4A, 4B:
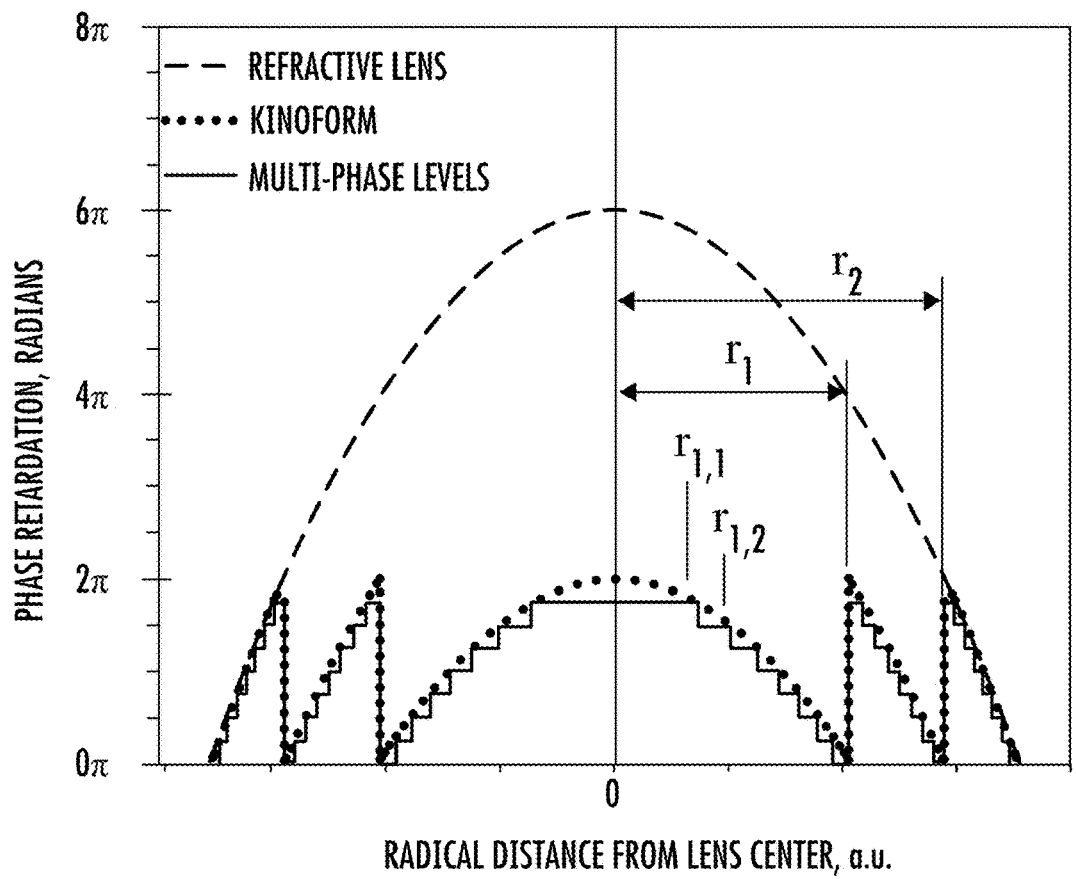
FIG. 4A is a schematic visualization of the discretization of an optical function.
FIG. 4B is a table comparing the diffraction efficiency of various approaches of encoding a hologram.
Figure 4C:
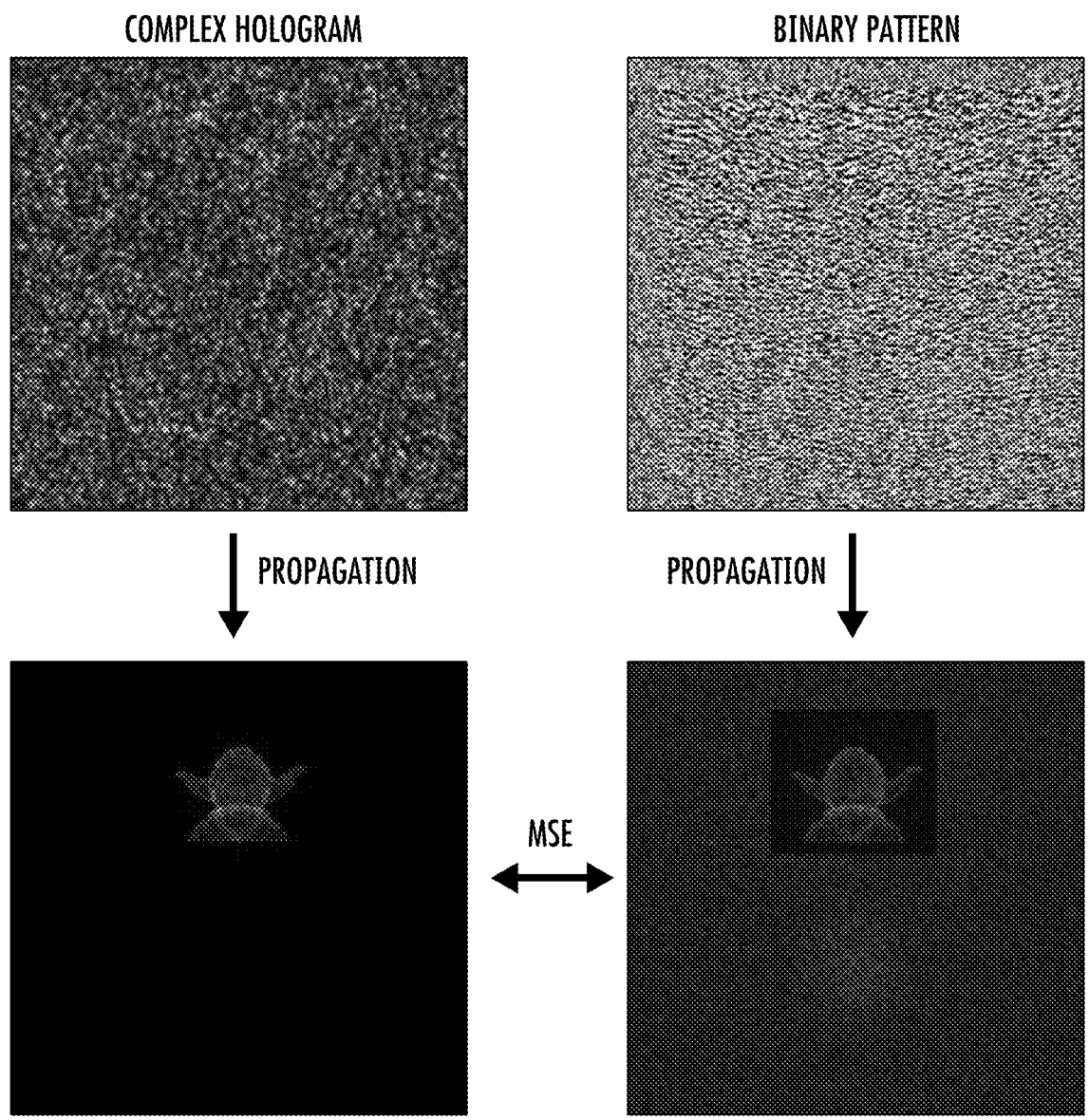
FIG. 4C shows an example of a complex hologram compared to a binary coded pattern, and the degradation of quality in the binary coded pattern.

Encoding a hologram in a 2D pixel plane necessarily requires discretizing the complex amplitude function, and this leads to inaccuracy and inefficiency. FIG. 4A is a schematic visualization of the discretization of an optical function, and FIG. 4B is a table comparing the diffraction efficiency of various approaches of encoding a hologram. FIG. 4C shows an example of a complex hologram compared to a binary coded pattern, and the degradation of quality in the binary coded pattern.

Figure 5A:
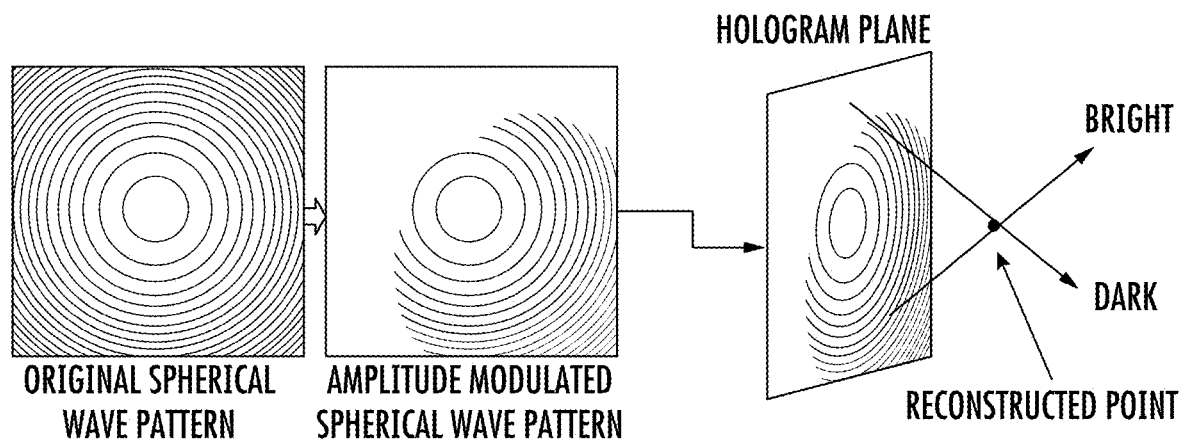
FIG. 5A illustrates an amplitude modulated hologram in which the color information is lost.
Figure 5B:
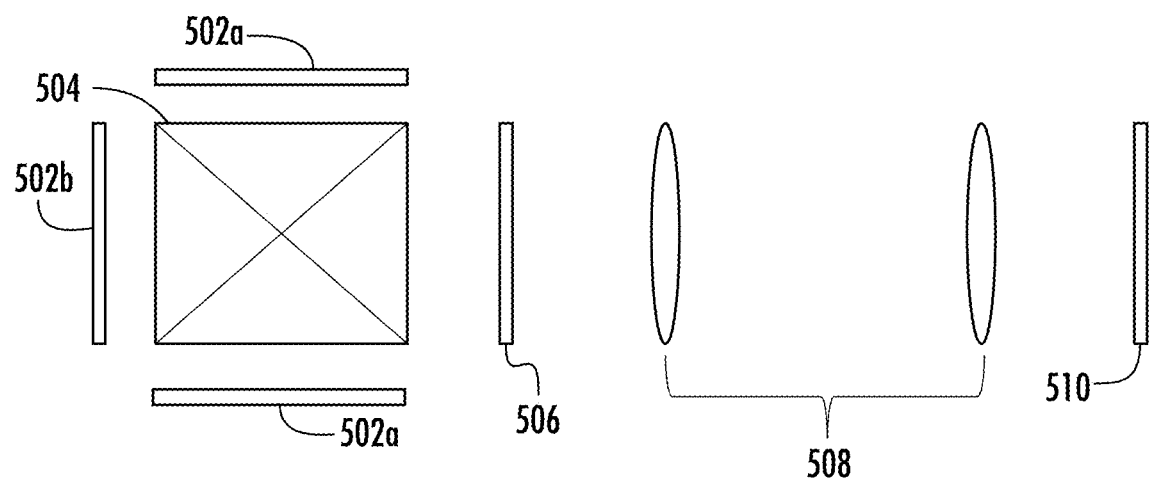
FIG. 5B illustrates the use of a combination of a phase-only modulator and amplitude-only modulator in series.

Referring back to FIGS. 1A, 1D, and 1E, the hologram recorded in a volume of recording material has volumetric effect and creates multiple planes of interferences, which allows for accurate modulation an energy field according to a complex amplitude function. As discussed above, encoding a hologram in a 2D pixel plane 202 would mean a significant amount of hologram is lost and the modulation of an energy field is now reduced from multiple planes in a volume down to just one plane of modulation. As a result, holograms encoded in a 2D pixel plane is monochromatic because it can only modulate phase or amplitude but not both, and a temporal multiplexing solution is required to modulate color. FIG. 5A illustrates an amplitude modulated hologram in which the color information is lost. FIG. 5B illustrates the use of a combination of a phase-only modulator 510 and amplitude-only modulator 506 in series to attempt to create a complex amplitude function. As illustrated, coherent light from panels 502a, 502b, and 502c may be combined by an x-cube 504, and the combined light is modulated by the amplitude-only SLM modulator 506 and relayed by a 4F relay system 508 to the phase-only SLM modulator 510. Such an approach requires alignment of the phase-only modulator and amplitude-only modulator on the scale of nanometers just to approach quality that are close to be comparable with a film-based hologram having nanoscale grain size. The current state of the art display technology, however, does not enable such precise alignment, resulting holograms that are grainy and poor quality when produced by the approach of FIG. 5B.

Non-Pixelated Dynamic Modulation

Figure 6A:
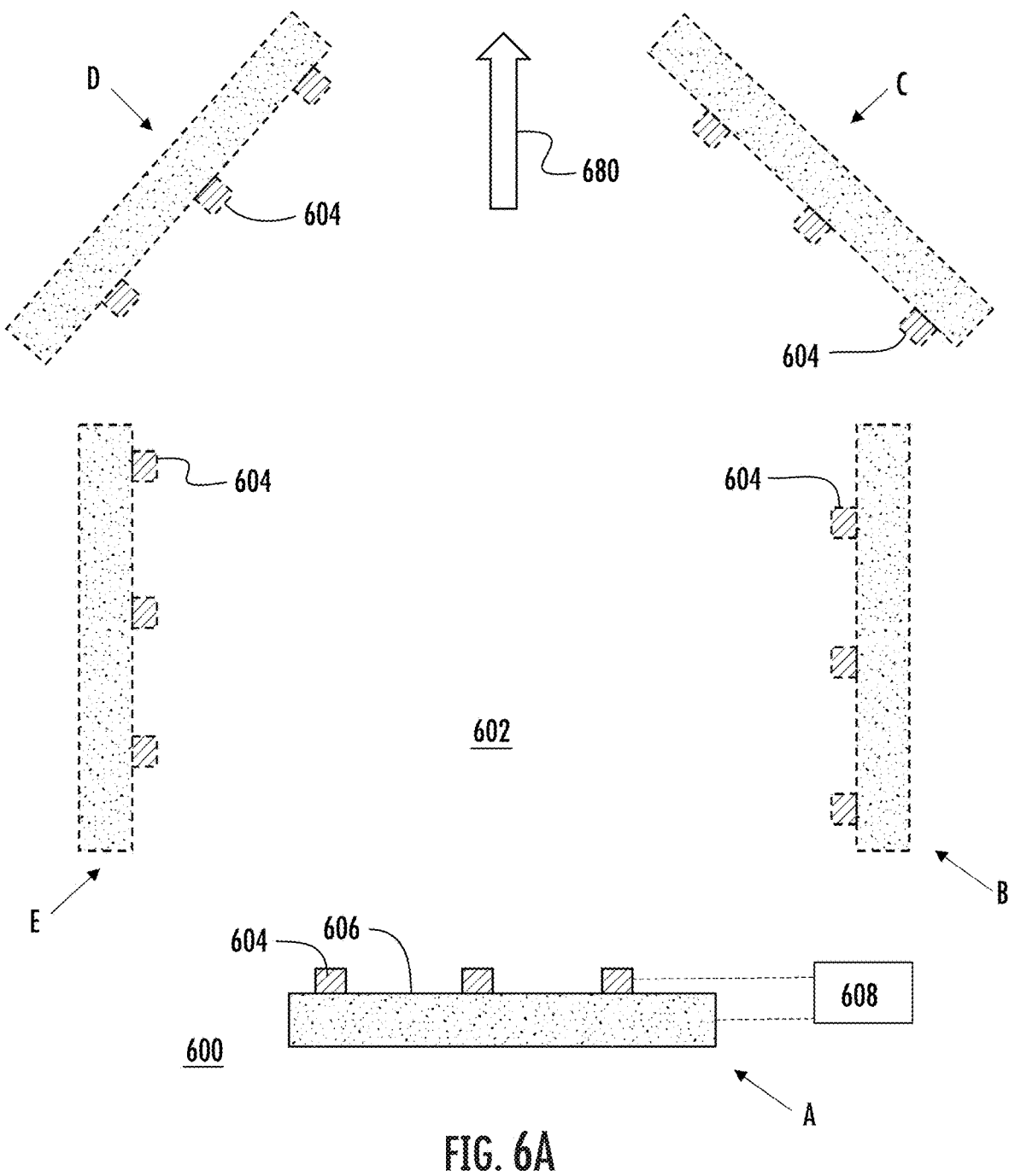
FIG. 6A shows an embodiment of a holographic energy system in accordance with the present disclosure.

In contrast to the above approaches, FIG. 6A shows an embodiment of a holographic energy system 600 operable to generate an output wavefront according to a complex amplitude function, in accordance with the principles of the present disclosure. In an embodiment, the system 600 includes a continuous three-dimensional energy medium 602, an array of energy devices 604 configured to output first energy operable to interact with the continuous three-dimensional energy medium 602 to define a hologram therein, an electromagnetic (EM) energy source 606 positioned to output coherent EM energy that is incident on the hologram in the continuous three-dimensional energy medium, and a controller 608 operable to provide instruction to the array of energy devices 604 so that the hologram in the continuous three-dimensional energy medium 602 modulates the coherent EM energy according to a complex amplitude function to generate an output wavefront. In an embodiment, the controller 608 is operable to update the instruction to the array of energy devices 604 to dynamically update the hologram in the energy medium 602 to generate dynamically updated output wavefront.

Figure 7:
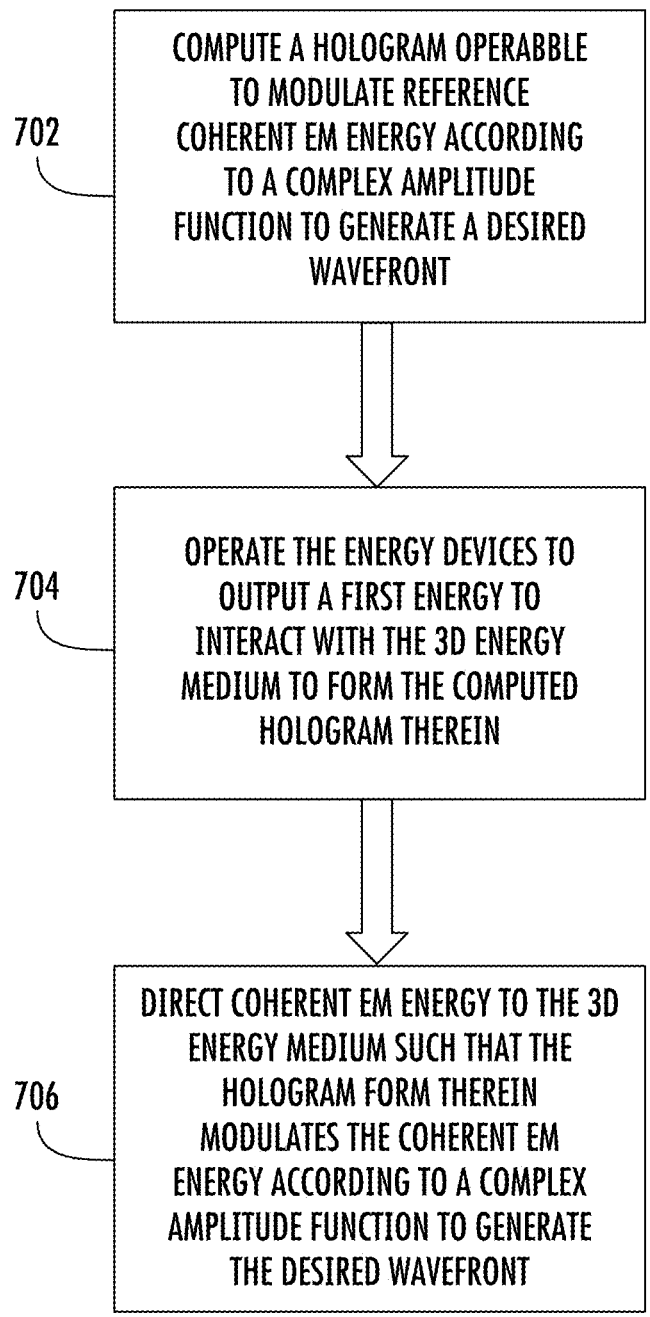
FIG. 7 is a flow chart diagram illustrating the operation of the holographic energy system of FIG. 6A.

In operation, the holographic energy system 600 may be used to produce a desired wavefront having a complex amplitude according to the steps shown in the flow chart diagram of FIG. 7. In step 702 of FIG. 7, a hologram for modulating reference coherent EM energy according to a complex amplitude function to produce a desired wavefront may be determined computationally. In an embodiment, the computational determination of the hologram may include CGH techniques based on holography principles, which will be illustrated with respect to embodiments to be discussed below in the present disclosure.

In step 704, in contrast with conventional CGH techniques of encoding a hologram in the pixels in a 2D plane of an SLM, the controller 608 of the holographic energy system 600 operates the energy devices 604 to output a first energy operable to interact with the 3D energy medium 602 of the holographic energy system 600 to form the computed hologram in the 3D energy medium 602. The first energy may be any form of energy that will interact and modify a state of the 3D energy medium 602, and can be, for example, electrical, magnetic, electromagnetic, mechanical, chemical, thermal, and other forms of energy, depending on the configuration of the 3D energy medium 602. Exemplary materials and methods for interacting and modifying the state of the 3D energy medium 602 will be discussed below with reference to the embodiments of the present disclosure.

In step 706, the EM energy source 606 is operated to output coherent EM energy to the 3D energy medium 602 such that the hologram formed therein modulates the coherent EM energy according to a complex amplitude function to produce the desired wavefront, which may be updated dynamically by repeating steps 702, 704, and 706.

Figure 6B:
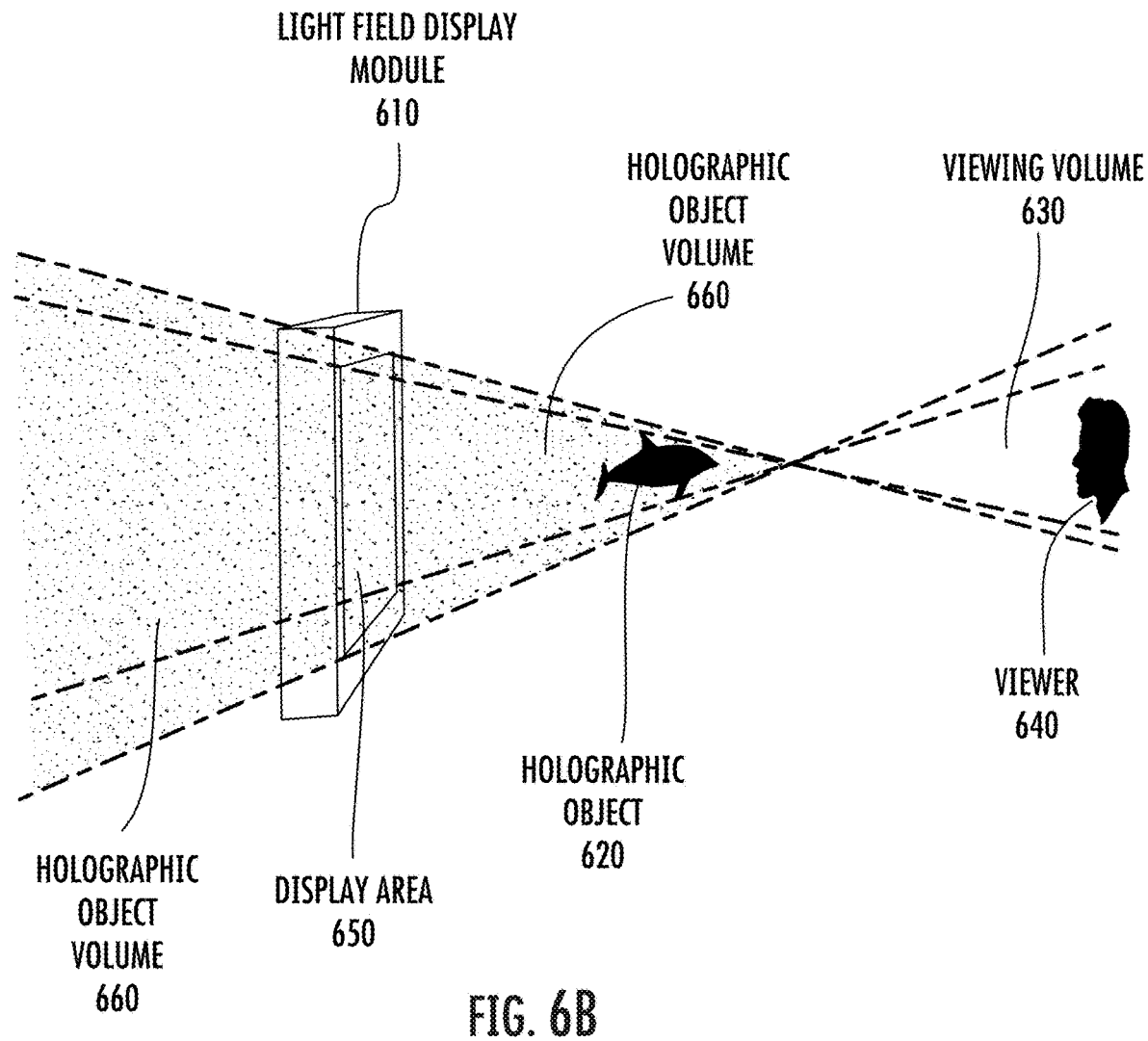
FIG. 6B illustrating an implementation of the holographic energy system of FIG. 6A in a LF display module.

In an embodiment, as shown in FIG. 6B, the holographic energy system 600 and the operation of the same as shown in FIG. 7 may be implemented as a light field (LF) display module 610, having a display area 650. An observer 640 in a viewing volume 630 may perceive the output wavefront from the display area 650 of the LF display module 610 forming one or more holographic objects 620 within a holographic object volume 660. The holographic object 620 can be presented such that it is perceived anywhere within the holographic object volume 660. A holographic object within the holographic object volume 660 may appear to the observer 640 to be floating in space.

A holographic object volume 660 represents a volume in which holographic objects may be perceived by an observer 640. The holographic object volume 660 can extend in front of the surface of the display area 650 (i.e., towards the observer 640) such that holographic objects can be presented in front of the plane of the display area 650. Additionally, the holographic object volume 660 can extend behind the surface of the display area 650 (i.e., away from the observer 640), allowing for holographic objects to be presented as if they are behind the plane of the display area 650. In other words, the holographic object volume 660 may include all the rays of light that originate (e.g., are projected) from a display area 650 and can converge to create a holographic object. Herein, light rays may converge at a point that is in front of the display surface, at the display surface, or behind the display surface. More simply, the holographic object volume 660 encompasses all of the volume from which a holographic object may be perceived by an observer.

A viewing volume 630 is a volume of space from which holographic objects (e.g., holographic object 620) presented within a holographic object volume 660 by the LF display system are fully viewable. The holographic objects may be presented within the holographic object volume 660, and viewed within a viewing volume 630, such that they are indistinguishable from actual objects. A holographic object is formed by projecting the same light rays that would be generated from the surface of the object were it physically present.

In some cases, the holographic object volume 660 and the corresponding viewing volume 630 may be relatively small—such that it is designed for a single observer. In other embodiments, the LF display modules may be enlarged and/or tiled to create larger holographic object volumes and corresponding viewing volumes that can accommodate a large range of observers (e.g., 1 to thousands). The flexible size and/or shape of a viewing volume 630 allows for observers to be unconstrained within the viewing volume 630. For example, an observer 640 can move to a different position within a viewing volume 630 and see a different view of the holographic object 620 from the corresponding perspective. To illustrate, referring to FIG. 1, the observer 640 is at a first position relative to the holographic object 620 such that the holographic object 620 appears to be a head-on view of a dolphin. The observer 640 may move to other locations relative to the holographic object 620 to see different views of the dolphin. For example, the observer 640 may move such that he/she sees a left side of the dolphin, a right side of the dolphin, etc., much like if the observer 640 was looking at an actual dolphin and changed his/her relative position to the actual dolphin to see different views of the dolphin. In some embodiments, the holographic object 620 is visible to all observers within the viewing volume 630 that have an unobstructed line (i.e., not blocked by an object/person) of sight to the holographic object 620. These observers may be unconstrained such that they can move around within the viewing volume to see different perspectives of the holographic object 620. Accordingly, the LF display system may present holographic objects such that a plurality of unconstrained observers may simultaneously see different perspectives of the holographic objects in real-world space as if the holographic objects were physically present.

In contrast, conventional displays (e.g., stereoscopic, virtual reality, augmented reality, or mixed reality) generally require each observer to wear some sort of external device (e.g., 3-D glasses, a near-eye display, or a head-mounted display) in order to see content. Additionally and/or alternatively, conventional displays may require that an observer be constrained to a particular viewing position (e.g., in a chair that has fixed location relative to the display). For example, when viewing an object shown by a stereoscopic display, an observer always focuses on the display surface, rather than on the object, and the display will always present just two views of an object that will follow an observer who attempts to move around that perceived object, causing distortions in the perception of that object. With a light field display, however, observers of a holographic object presented by the LF display system do not need to wear an external device, nor be confined to a particular position, in order to see the holographic object. The LF display system presents the holographic object in a manner that is visible to observers in much the same way a physical object would be visible to the observers, with no requirement of special eyewear, glasses, or a head-mounted accessory. Further, the observer may view holographic content from any location within a viewing volume.

In an embodiment, the LF display system may also augment the holographic content with other sensory content (e.g., touch, audio, smell, temperature, etc.). For example, the projection of focused ultrasonic sound waves may generate a mid-air tactile sensation that can simulate a surface of some or all of a holographic object. The LF display system includes one or more LF display modules 610.

Continuous Three-Dimensional Energy Medium

Turning back to FIG. 6A, the continuous and volumetric nature of the 3D energy medium 602 allows for much improved performance over a 2D pixel plane. The 3D energy mediums 602 modulates the coherent EM energy passing through a continuous three-dimensional volume, thereby providing the volumetric effect and resolution comparable to a film-based hologram, which in turn, allow for output of high-quality wavefront while being operable to be dynamically updated and refreshed.

Various configuration of the 3D energy medium 602 may be adopted to implement the principles of the present disclosure. In an embodiment, the continuous three-dimensional energy medium 602 comprises at least first and second immiscible phases. In an embodiment, the 3D energy medium 602 can include additional immiscible phases in additional to the first and second immiscible phases In an embodiment, the first immiscible phase forms a first dispersion medium and the second immiscible phase forms a first dispersed phase in the first dispersion medium. The first dispersed medium and first dispersed phase may form a suspension or a colloid. A suspension may be understood to be a heterogeneous mixture in which the solute particles do not dissolve, but get suspended throughout the bulk of the solvent, left floating around freely in the medium The internal phase (solid) is dispersed throughout the external phase (fluid) through mechanical agitation, with the use of certain excipients or suspending agents. An example of a suspension would be sand in water. The suspended particles are visible under a microscope and will settle over time if left undisturbed. This distinguishes a suspension from a colloid, in which the suspended particles are smaller and do not settle A colloid may be understood to be a mixture in which one substance of microscopically dispersed insoluble particles are dispersed throughout another substance. A colloid has a dispersed phase (the suspended particles) and a continuous phase (the medium of suspension). Colloids and suspensions are different from solutions, in which the dissolved substance (solute) does not exist as a separate phase, and solvent and solute are homogeneously mixed.

In an embodiment, the first dispersed medium and the first dispersed phase and the first dispersed medium can form a liquid aerosol, a solid aerosol, a liquid foam, a solid foam, an emulsion, a gel, a liquid-solid sol, or a solid-solid sol.

The first dispersed phase may include comprises various materials, including organic materials, inorganic materials, polymeric materials, metallic materials, glass-based materials, composite materials, radioactive materials, microbial materials, and bioluminescent materials. While the use of radioactive materials, such as plutonium, uranium, and thorium, may be subject to extensive regulations and safety requirements, synergy may be found in certain optical applications based on x-ray or gamma-ray diffraction. In such an embodiment, it is to be appreciated that the holography principles described in the present disclosure, including various wave propagation models based on the Maxwell equations, may be further modified to account for wave behaviors according to quantum mechanics principles, including the special theory of relativity and the Schrodinger equation.

In an embodiment, the first dispersed material may include programmable materials, wherein the first energy is operable to interact with the programmable materials to change at least one property of the programmable materials. The programmable materials may include nanoparticles, metamaterials, liquid crystals, programmable biohybrids, or nanomachines. Depending on the type of programmable materials, various properties of the programmable materials may be programmed to dynamically interact with input energy to provide a desired output energy wavefront, including a morphology, an orientation, a geometrical property, a spatial property, a temporal, an optical property, a diffractive property, a refractive property, a reflective property, a transmissivity, a chromatic property, a scattering property, a diffusive property, and a luminescence property. The programmable properties of the of the programmable materials may include the collective or localized properties of the programmable materials.

While the above embodiments are provided to illustrate various 3D energy medium 602 having at least first and second immiscible phases that comprise at least a dispersed phase and a dispersed medium, other configurations of the 3D energy medium 602 may be used. In an embodiment, the first and second immiscible phases of the 3D energy medium can be formed to define a conformal, programmable interface therebetween. In an embodiment, at least one of the first and second immiscible phases comprises a programmable liquid metal. A morphology of the programmable liquid metal can be altered due to interaction with the first energy provided from the energy devices 604. In an embodiment, programmable liquid metal comprises a gallium-based liquid metal, an indium-based liquid metal, a liquid metal alloy or any other programmable 1 liquid metal operable to interact with the first energy. In an embodiment, the other one of the first and second immiscible phase comprises a tunable optical element.

Modulation System Configurations

With reference to FIGS. 6A, 6B, and 7, it is to be appreciated that the 3D energy medium 602 can have various combinations of reflective, transmissive, refractive, or diffractive components. Depending on the configuration of the 3D energy medium 602, the formation of a hologram in the 3D energy medium 602 in step 704 and reconstruction of an output wavefront according to a complex amplitude function in step 706 can be implemented by locating the energy devices 604 and the EM energy source 606 in various positions relative to each other and relative to the 3D energy medium 602. Shown in FIG. 6A is a direction 680 along which the output wavefront may generally propagate towards a viewing volume 630, an example of which is shown in FIG. 6B. In an embodiment, the EM energy source 606 may be located in any position and orientation that will not obstruct the propagation of the output wavefront along direction 680. In an embodiment, as illustrated by positions A, B, and E in FIG. 6A, the EM energy source 606 can be located such that the EM energy from the EM energy source 606 will be propagated at least partially through the energy medium 602. In these embodiments, the energy medium 602 may have at least partially transmissive or emissive components to allow the propagation of energy therethrough by diffraction, refraction, reflection, scattering, or any combination thereof. In an embodiment, as illustrated by positions C and D in FIG. 6A, the EM energy source 606 can be located such that the EM energy from the EM energy source 606 will be at least partially reflected by the energy medium 602. In these embodiments, the energy medium 602 may have at least partially reflective or emissive components to allow the propagation of energy therethrough by diffraction, refraction, reflection, scattering, or any combination thereof.

In an embodiment, depending on the type of energy to be output by the energy devices 604, the energy devices 604 can be made of transparent materials and located anywhere relative to the 3D energy medium 602. For example, in an embodiment, the energy devices 604 can be made of transparent materials such as transparent dielectrics, silicon dioxide, glass, transparent conducting oxides such as indium tin oxide (ITO), and liquid crystal materials. In an embodiment, transparent energy devices 604 even if disposed in a path along direction 680, would still allow modulated energy from the energy medium 602 to continue to propagate substantially without loss. In an embodiment, as illustrated by example positions A, B, C, D, E, transparent energy devices 604, even if disposed in a location that would intercept the coherent EM energy from the EM energy source 606, would still allow the coherent EM energy to propagate substantially without loss therethrough and to the energy medium 602.

Exemplary examples of 3D energy medium configuration and the corresponding methods of forming a hologram in the 3D energy medium will be discussed below.

Holography Principles for Computing a Hologram

As mentioned above, various holography principles and models may be used to computationally determine a computational hologram for modulating reference coherent EM energy according to a complex amplitude function to produce a desired wavefront. Holography principles and models are based on wave physics, which consider energy as an electromagnetic wave of an arbitrary wavelength. The propagation and interference of electromagnetic wave provide the analytical bases for determining a computational hologram.

Wave equations define the analytical framework for the propagation of electromagnetic wave. Analytical solution to the wave equations describes a wavefield of a propagating wavefront anywhere in space. However, obtaining an analytical solution for an arbitrary object having arbitrary shape and size is complex and nearly impossible. Instead, a numerical solution of the wave equations may be determined computationally, but even the computational determination can be time consuming and impractical. As such, various approximation model can be derived and used to simplify the computational determination of the numerical solution of the wave equations.

In one approach, the solution to vectoral wave equations are approximated by making certain assumptions to reduce the wave equations to scalar components. These integral equations are scalar in nature and hence are also called as scalar diffraction formulas. These approximated solutions based on scalar diffraction can be referred to as the "scalar theory" and can simplify computational determination of a hologram with satisfactory resolution and accuracy in holographic display applications.

The starting point of the scalar diffraction theory are the Maxwell equations that describe an electromagnetic energy wave. When it is assumed that an electromagnetic energy wave is propagating in a linear, uniform, isotropic, homogeneous, and non-dispersive material, the vector wave equation 1.1 below can be derived from the Maxwell equations to describe the electric field component:

$$\nabla^2 E = \mu_0 \epsilon_0 \epsilon_r \frac{d^2}{dt^2} E \quad (1.1)$$

where $\epsilon_0$ is the permittivity of vacuum, $\epsilon_r$ is a relative permittivity, and $\mu_0$ is the permeability of vacuum.

Since light behaves like a wave, the vector wave equation 1.1 can be written in the form of a scalar wave equation 1.2:

$$\nabla^2 u(p,t) - \frac{1}{c^2} \frac{d^2 u(p,t)}{dt^2} = 0 \quad (1.2)$$

where c is the speed of the wave in a dielectric media. Comparing the vector wave and scalar wave equations 1.1 and 1.2, the speed of light is can be written as:

$$c = 1/\sqrt{\mu_0 \epsilon_0 \epsilon_r} = \frac{c_0}{n} \quad (1.3)$$

where $c_0$ is the speed of light in vacuum and equal to $1/\sqrt{\mu_0 \epsilon_0}$, and n is the refractive index and equal to $\sqrt{\epsilon_r}$.

The component u(p, t) can be considered as a wave function defining a scalar field component at the given position p and time t in a material having the refractive index n. For a monochromatic wave, the scalar field function can be written as a complex amplitude according to equation 1.4:

$$u(p,t) = \text{Re}\{U(p)e^{-i\omega t}\} \quad (1.4)$$

where $\omega$ is the cyclic frequency of the light and is equal to $2\pi v$.

The function U(p) is referred to as a complex amplitude given by equation 1.5:

$$U(p) = A(p)e^{i\phi(p)} \quad (1.5)$$

wherein A(p) is a real value that can be understood as the amplitude and $\phi(p)$ can be understood as the phase of the complex amplitude. The complex amplitude U(p) is a three-dimensional function, and its two-dimensional distribution in a given plane is referred to as a wavefield.

Substituting equations 1.4 and 1.5 into the wave equation in equation 1.2, the wave equation can be rewritten in the same form as the Helmholtz equation:

$$\nabla^2 U(p) + k^2 U(p) = 0 \quad (1.6)$$

where $\lambda$ is the wavelength of light, and k is equal to $2\pi/\lambda$ and referred to as a wave number.

CGH Modeling Plane and Spherical Waves

In CGH models, the object wave, the reference wave, and the signal wave can be modeled as plane waves or spherical waves based on the wave equations discussed above. Plane waves have plane wavefronts, have a constant frequency and amplitude, and extend indefinitely, which is not a real physical behavior. However, for a given space, any complex wavefront can be modeled as a local plane wave. The solution to the wave equations above for a plane wave is:

$$u(p,t)=A\cos(\vec{k}\cdot\vec{p}-\omega t+\varphi_0) \quad (1.7)$$

where $\varphi_0$ is a constant defining the phase of the cosine function at time t=0 and at r=0, $\vec{p}$ is a position vector, and $\vec{k}$ defines a wave vector pointing in the direction of propagation with a length $$|\vec{k}|=\frac{2\pi}{\lambda_0}$$

in which $\lambda_0$ is the wavelength of the light in vacuum.

Based on equations 1.4 and 1.5, the complex amplitude of a plane wave described by equation 1.7 can be written as:

$$U(p)=A\,e^{i(\vec{k}\cdot\vec{p}+\varphi_0)} \quad (1.8)$$

In Cartesian coordinates, the wavefield of a plane wave at $z=z_0$ is:

$$U(x,y;z_0)=A\,e^{i(k_x x+k_y y+k_z z_0+\varphi_0)} \quad (1.9)$$

Spherical waves are emitted from a single point source and have spherical wavefronts. The solution to the wave equations above for a plane wave is:

$$u(p,t)=A/r\cos(kr\pm\omega t+\varphi_0) \quad (1.10)$$

where r is the radial distance in a spherical coordinate system and can be determined based on Cartesian coordinates, x, y, z as shown in equation 1.11:

$$r=|p|=\sqrt{x^2+y^2+z^2} \quad (1.11)$$

Based on equations 1.4 and 1.5, the complex amplitude of a spherical wave described by equation 1.10 can be written as:

$$U(p)=A/r\,e^{\pm i(kr+\varphi_0)} \quad (1.12)$$

In Cartesian coordinates, the wavefield of a spherical wave at $z=z_0$ is:

$$U(x,y;z_0)=A/r\,e^{\pm i(kr+\varphi_0)} \quad (1.13)$$

where $$r=\sqrt{x^2+y^2+z_0^2} \quad (1.14)$$

Based on equations 1.9 and 1.14, a wavefield can be sampled at various (x, y) positions at the $z=z_0$ plane for a plane wave or a spherical wave, respectively.

CGH Modeling of Field Propagation

Figure 8A:
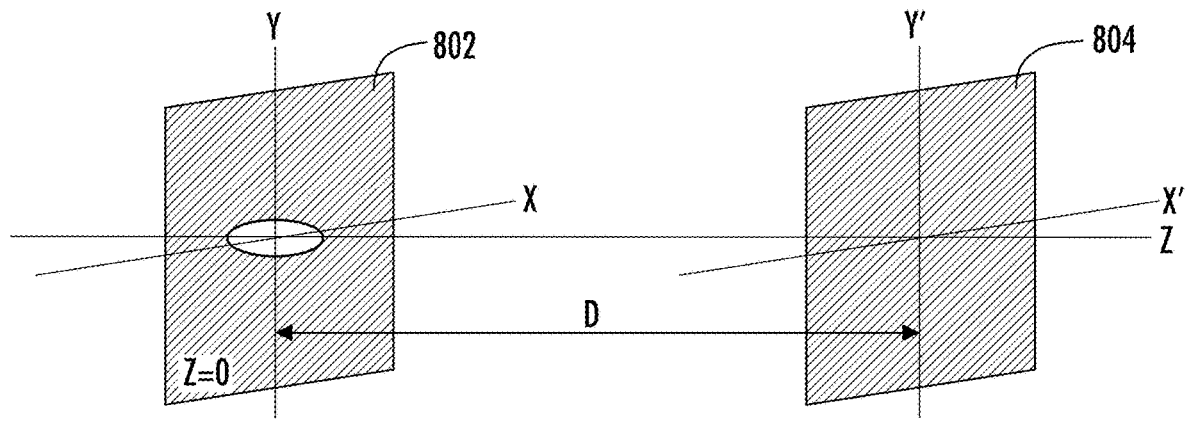
FIG. 8A shows a coordinate system for a wave propagation model.

A wave in free space according to the assumptions of the scalar theory is described by the wave equations 1.2 and 1.6, and the plane and spherical waves discussed above are specific solutions to the wave equations 1.2 and 1.6. Boundary conditions can help solve the wave equations 1.2 and 1.6 to provide a more general solution for a wave that propagates in free space. When light is diffracted by an aperture, the boundary condition can be understood to be a binary function, in which the value of the function is unity inside the aperture and zero outside the aperture. In an embodiment, the a wavefield defined by a first complex amplitude in a first plane can be used as the boundary condition for solving the wave equations 1.2 and 1.6 to obtain a diffracted wavefield defined by a second complex amplitude in a second plane at any location in a 3D space. In an embodiment, a computational implementation of this process may be referred to as numerical field propagation and include the steps of sampling a source wavefield (i.e., the first amplitude) and using it as a boundary condition to numerically solve the wave equations to simulate the destination/diffracted field (i.e., the second complex amplitude). FIG. 8A shows a coordinate system for this analytical framework discussed above. In a cartesian coordinate system, the source field U(x, y; $z_0$) is located in the source plane 802 and is propagated by a distance d to the diffracted field U(x', y'; z) located in the plane 804. The spatial coordinates for a point in plane 802 and a point in plane 804 and have coordinates (x', y', 0) and (x, y, z) respectively.

The propagation of wavefield can be modelled according to a number of diffraction formulations known in the art, including Fresnel-Kirchhoff diffraction and Rayleigh-Sommerfeld diffraction. Both Fresnel-Kirchhoff formulation and Rayleigh-Sommerfeld formulation have been derived and described extensively in the art, and thus detailed derivation will not be repeated here.

The Fresnel-Kirchhoff diffraction formulation relies on Green's identities to express the disturbance at an arbitrary point P as a function of the values of the solution of the wave equation and its first order derivative at all points on an arbitrary surface which encloses P. Its most general form can be written as equation 1.15 below:

$$U(P_0)=\frac{1}{4\pi}\iint_{S_1+S_2}\left(\frac{\partial U}{\partial n}G-U\frac{\partial G}{\partial n}\right)ds,\text{ where }G=\frac{\exp(jkr_{in})}{r_{in}} \quad (1.15)$$

where U is the complex amplitude of the disturbance at the surface, and s is the distance from P to the surface.

In the coordinate system in FIG. 8, the Fresnel-Kirchhoff formulation can be written as equation 1.16 below:

$$U(x,y;z)=-\frac{i}{\lambda}\int U(x',y';0)\frac{e^{jkr}}{r}\frac{(1+co)}{2}dx'dy' \quad (1.16)$$

where $r=[(x-x')^2+(y-y')^2+z^2]^{1/2}$, and $\chi$ is the diffraction angle at point (x', y', 0) between the diffracted wave and the normal of the z=0 plane. The Fresnel-Kirchhoff formulation is an approximate scalar solution of the Helmholtz equation that is generally accurate unless very close to the aperture. The component $$\frac{(1+\cos\chi)}{2}$$

in equation 1.16 is also known as the obliquity factor and can be approximated to be 1 when the diffraction angle is small.

Determining a solution for the integral in equation 1.16 can be challenging for most applications, and certain assumptions can be made for r in equation 1.16 to derive approximated diffraction models known in the art that are easier to solve either analytically or numerically.

For example, Fresnel approximation is a known approximation model that can simplify equation 1.16 by making several approximations. The first approximation is based on the assumption that the diffraction angle is small, and thus the component $$\frac{(1+\cos\chi)}{2}$$

in equation 1.16, which is also known as the obliquity factor, can be approximated to 1. The assumption that the diffraction angle is small also allows the approximation of r in the denominator of $$\frac{e^{ikr}}{r}$$

to be z. However, in the exponent of the $$\frac{e^{ikr}}{r},$$

a small variation in r can significantly change the value of $e^{ikr}$. Thus, a more accurate approximation of r can be made by assuming $z \gg (x-x')^2 + (y-y')^2$ truncating the expansion of $r = [(x-x')^2 + (y-y')^2 + z^2]^{1/2}$ according to equation 1.17:

$$r \approx z + \frac{(x-x')^2 + (y-y')^2}{2z} \tag{1.17}$$

The Fresnel diffraction integral in equation 1.17 can be derived from the above assumptions:

$$U(x, y; z) = \frac{e^{ikz}}{i\lambda z} \int U(x', y'; 0) e^{\frac{ik}{2z}[(x-x')^2 + (y-y')^2]} dx' dy' \tag{1.18}$$

The Fresnel diffraction integral can be solved using various numerical techniques known in the art, including fast Fourier transforms.

The Fraunhofer approximation is another approximation that can simplify the Fresnel-Kirchhoff diffraction formula. As a diffraction pattern continuously evolves along the z-direction, at a distance far from the aperture, it eventually evolves into a final diffraction pattern that maintains itself as it continues to propagate (although it increases its size in proportion to distance). This far-away diffraction pattern in a far field is described by the Fraunhofer approximation. This is the limiting case of the Fresnel approximation when the field is observed at a distance far after the aperture.

Equation 1.18 can be expanded into equation 1.19 below, $$U(x, y; z) = \frac{e^{ikz}}{i\lambda z} \int U(x', y'; 0) e^{\frac{ik}{2z}[(x^2+y^2) - 2(xx'+yy') + (x'^2+y'^2)]} dx' dy' \tag{1.19}$$

and in far field condition $(z \gg k/2)$, the exponential component $e^{ik/2z(x'^2+y'^2)}$ in equation 1.19 can be approximated to be 1, resulting in the Fraunhofer diffraction integral as shown in equation 1.20 below:

$$U(x, y; z) = \frac{e^{ikz} e^{\frac{ik}{2z}[(x^2+y^2)]}}{i\lambda z} \int U(x', y'; 0) e^{\frac{ik}{z}(xx'+yy')} dx' dy' \tag{1.20}$$

The Fraunhofer integral can be interpreted as a two-dimensional (inverse) Fourier transform on the source wave field U(x', y'; 0) where kx/z and ky/z can be considered as spatial frequencies.

The above discussed Fresnel and Fraunhofer approximations can also be applied to Rayleigh-Sommerfeld formulation of diffraction. Compared to the Fresnel-Kirchhoff formulation, the Rayleigh-Sommerfeld formulation provides more rigorous solutions in equations 1.21 (first solution) and 1.22 (second solution) using two different boundary conditions.

$$U_1(P_0) = -\frac{1}{2\pi} \int\int_\Sigma U \frac{\partial G_k}{\partial n} ds \tag{1.21}$$

and $$U_n(P_0) = \frac{1}{2\pi} \int\int_\Sigma \frac{\partial U}{\partial n} G_k ds \tag{1.22}$$

In the coordinate system in FIG. 8, the first solution to the Rayleigh-Sommerfeld formulation can be written as equation 1.23 below:

$$U(x, y; z) = \int U(x', y'; 0) \frac{e^{ikr}}{r} \frac{z}{r} \left( \frac{1}{2\pi} + \frac{1}{i\lambda} \right) dx' dy' \tag{1.23}$$

Applying the same assumptions in the Fresnel approximation discussed above, (i.e., $r \approx z$ for the non-exponential components and $$r \approx z + \frac{(x-x')^2 + (y-y')^2}{2z}$$

in the exponential component), equation 1.23 can be simplified to equation 1.24:

$$U(x, y; z) = \frac{e^{ikz}}{i\lambda z} \int U(x', y'; 0) e^{\left[\frac{i\pi}{\lambda z}(x-x')^2 + (y-y')^2\right]} dx' dy' \tag{1.24}$$

From the Fresnel approximation in equation 1.24, the Franhofer approximation can be applied similarly to further simply equation 1.24 to $$U(x, y; z) = \frac{e^{ikz} e^{\left[\frac{ik}{2z}(x^2+y^2)\right]}}{i\lambda z} \int U(x', y'; 0) e^{\frac{ik}{z}(xx'+yy')} dx' dy' \tag{1.25}$$

The Rayleigh Sommerfeld formulation is a more rigorous model than the Fresnel Kirchhoff formulation because of the former's the mathematical consistency and the latter's ability to reproduce closely the diffracted field right behind the aperture. However, the Rayleigh Sommerfeld formulation is limited by its assumption of a plane surface, and the Fresnel Kirchhoff formulation can handle surfaces of any shape, thereby allowing for more accurate propagations in optical applications.

The assumptions in the scalar theory discussed above may be not applicable in some applications. For example, in an embodiment, more accuracy may be needed in some applications where there are significant deviations from the assumptions of the scalar theory (i.e., monochromatic wave, a linear, uniform, isotropic, homogeneous, and non-dispersive material). A more rigorous approach maybe used to model the propagation of a wavefront through a modulating 3D energy medium 602 without some or all of the assumptions made under the scalar theory.

More rigorous diffraction models can account for couplings between the various components of electric and the magnetic fields. In an embodiment, a more rigorous diffraction model suitable for implementation of the present disclosure may include provide wave equations and boundary conditions that can be solved exactly without approximation. Analytical solutions for the more rigorous diffraction models may be more accurate for a wider scope of applications, but the mathematical complexity can make determining analytical solution impractical. Instead, in an embodiment, numerical solutions can be determined for the more rigorous models in some implementations of the present disclosure.

In the coupled waved theory, a periodic grating structure and a diffracted field can be described in the form of Fourier series. The Fourier expression helps to reduce the mathematical complexity of the boundary problem.

Figure 8B:
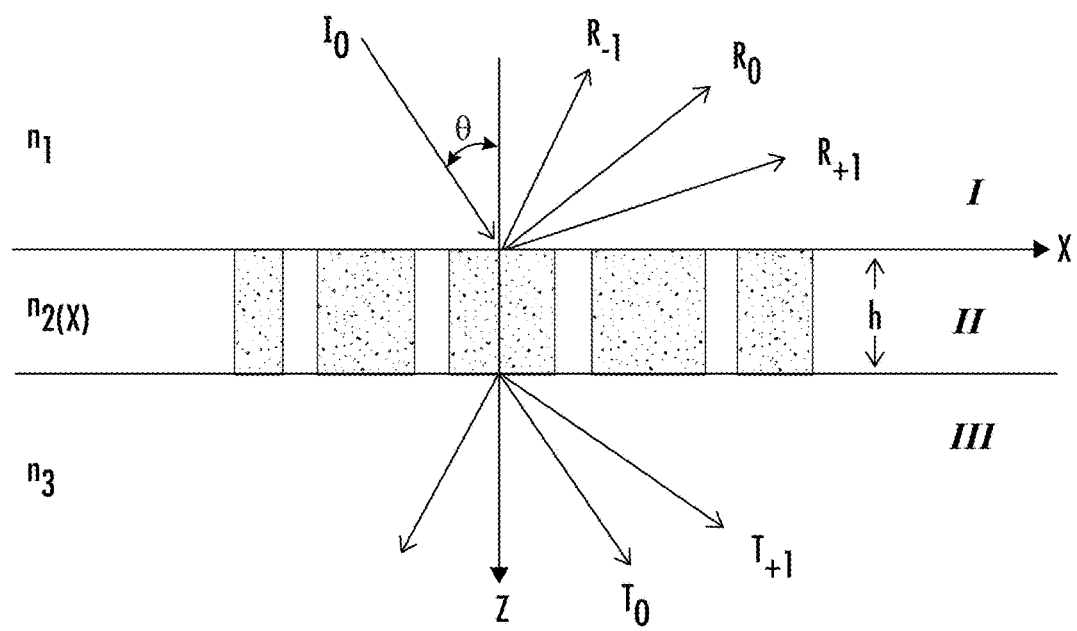
FIG. 8B diffraction grating geometry for the coupled wave model.

FIG. 8B shows a diffraction grating geometry, where the space is divided into three regions labeled as I (Z<0), II (0≤Z≤h) and III (Z>h). The media in Region I and Region III are supposed to be homogeneous. Region II includes a periodic structure, which is modulated in the x-direction but is invariant in the ydirection. This periodic structure allows the decomposition of the TE and the TM components of the electromagnetic field inside Region II.

A unit amplitude monochromatic plane wave ($I_0$) with wavelength $\lambda$ incident from Region I onto Region II at an angle $\theta$ with respect to the z-axis in the xz-plane. The diffracted fields in both Region I and Region III are expressed as series of plane waves.

The electromagnetic field inside Region II can be decomposed into two orthogonal components: electric-field vector parallel to the grating grooves and electric-field vector perpendicular to the grating grooves. In the polarization direction of electric-field vector parallel to the grating grooves, the field can be separated as $E_y(x, z)=X(x)Z(z)$ and applied into the Helmholtz wave equations, which can be used to solve $Z(z)$ and $X(x)$ and derive a set of linear equations that may be expressed in a matrix form MP=$\gamma$2P. The electromagnetic field in Region II, in the polarization, can be expressed as:

$$E_y(x, z) = \sum_{m=-x}^{x} \sum_{n=1}^{x} P_{mn} \exp(i\alpha_m x)\{A_n \exp[i\gamma_n z] + B_n \exp[-i\gamma_n(z - h)]\} \quad (1.26)$$

where coefficients $P_{mn}$ and $\gamma_n$ can be solved from the matrix M eigenvalue problem by standard numerical techniques. A similar expression can be obtained for the polarization direction of electric-field vector perpendicular to the grating grooves. With the exact representations of the electromagnetic fields in all regions I-III, the coupled wave theory allows for solving the unknown parameters Rm, Tm, An and Bn from the electromagnetic boundary conditions.

It is to be appreciated that the above discussed coupled waves theory is provided herein as an example of a model for energy wavefield propagation without making the assumptions of scalar theory. A number of other modelling approaches not based on the assumptions of the scalar theory, such as the N-coupled wave theory and the Parallel Stacked Mirrors theory, are also well known in the art and will not be repeated here. One of ordinary skill in the art will appreciate that these models, are also suitable to be implemented herein like the coupled wave theory to model the propagation of energy field in accordance with the principles of the present disclosure.

Propagation of Through Various Energy Medium Constructions

The computation of a hologram may be implemented using various physical interference modeling and modulation modeling approaches. In physical interference modeling, the optical interference between the wavefront in an object wave and the wavefront of a simulated reference wave are propagated to determine the interference between the object wave and reference wave to generate a hologram. In modulation modeling, a hologram is determined computationally based on its modulation of a reference wavefront to form a desired modulated wavefront that can be observed by an observer as objects in a holographic volume. Relative to physical interference algorithms, modulation modeling algorithms offer reduced computational cost in some embodiments.

Figure 9A:
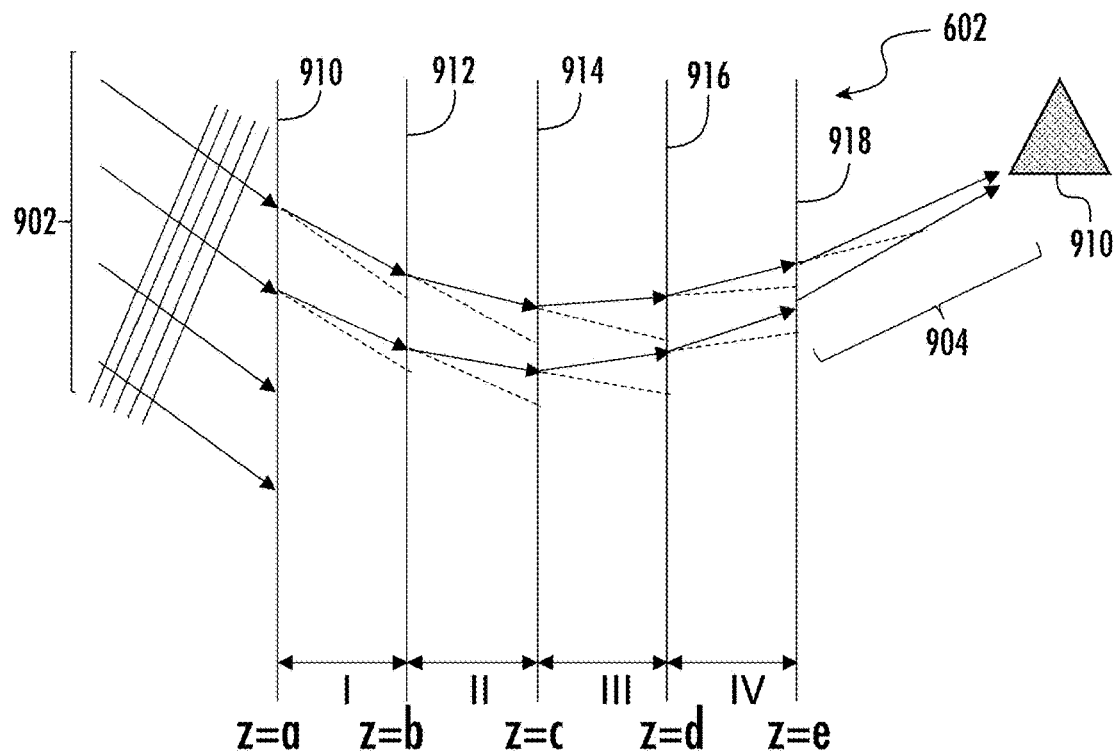
FIGS. 9A-9C illustrates propagation of wavefields through different 3D energy medium configurations.
Figure 9B:
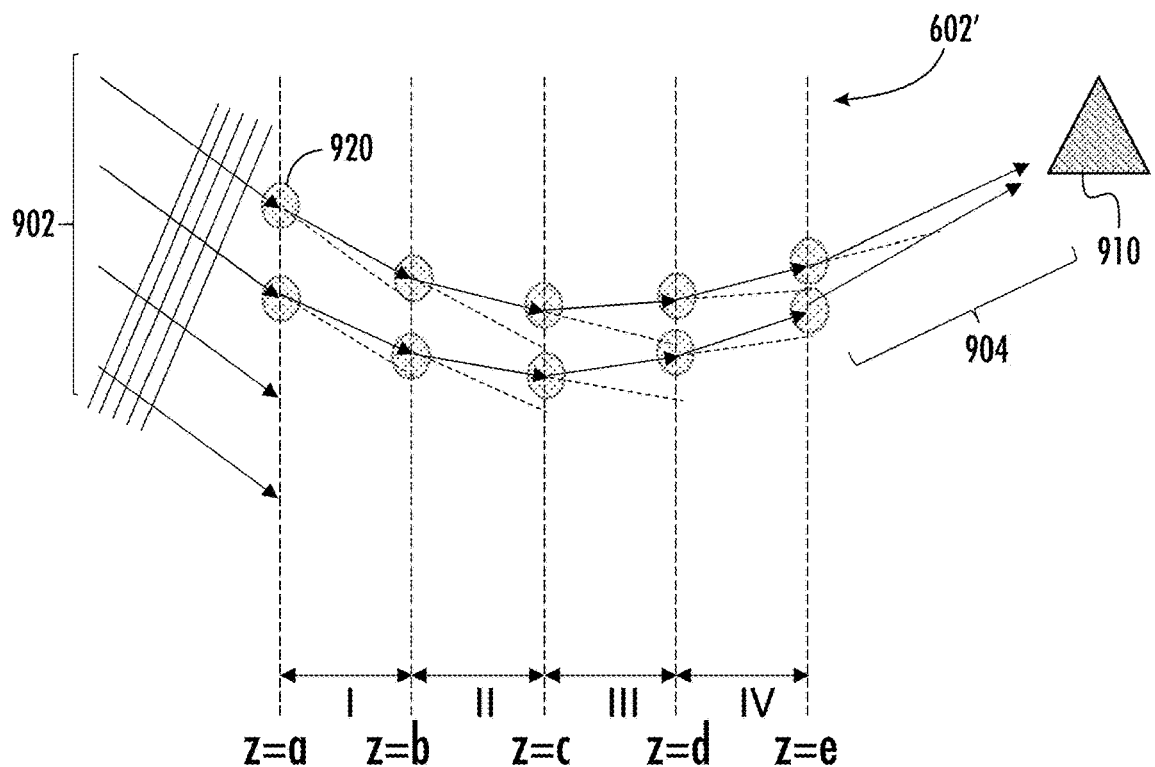
Figure 9C:
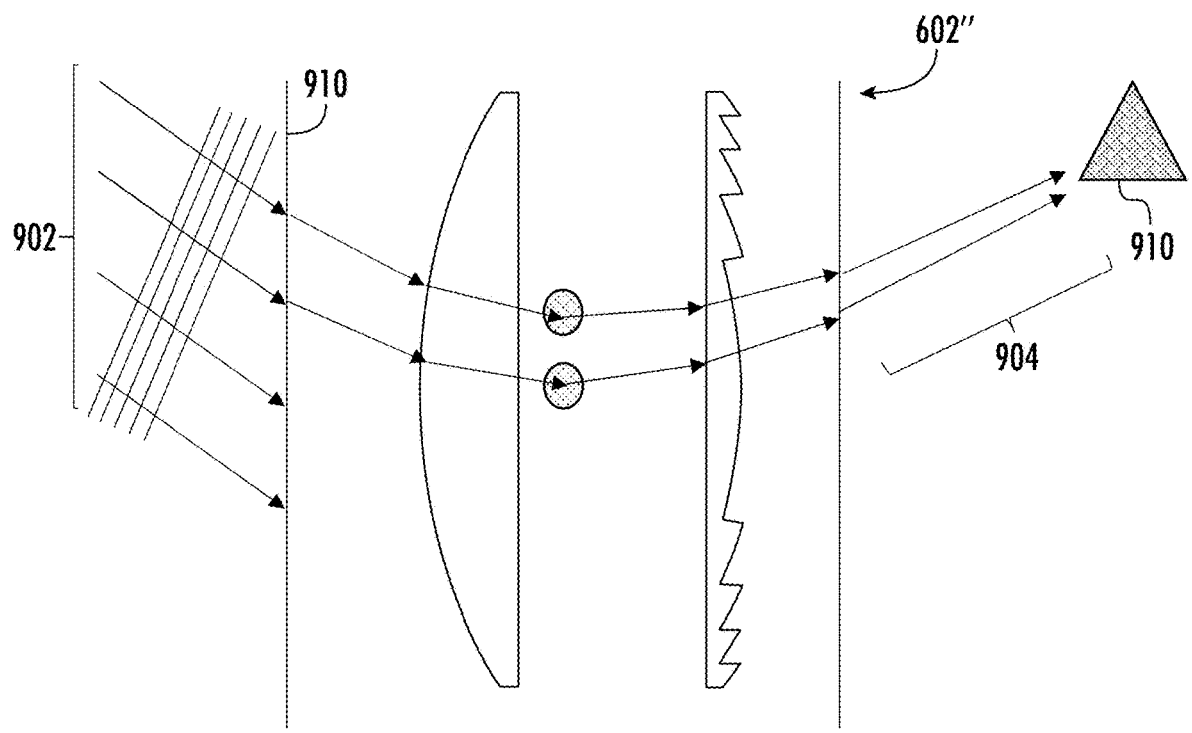

Turning to FIGS. 9A-9C, an embodiment of the 3D energy medium 602 is schematically illustrated to demonstrate the propagation of wavefields through the 3D energy medium 602, 602', and 602". In an embodiment, a reference wavefront 902 incident on the 3D energy medium 602 may comprise a coherent electromagnetic energy wave provided from the electromagnetic energy source 606 shown in FIG. 6. The reference wavefront 902 may be modeled as a plane wave, a spherical wave, or any other wavefront model known in the art in accordance with the principles disclosed in the present disclosure. The 3D energy medium 602 may be configured to form a hologram therein to modulate the incident reference wavefront 902 according to a complex amplitude function to result in an output wavefront 904 that can be perceived as one or more holographic object 910 by an observer within a viewing volume.

In an embodiment, given known desired output wavefront 904 and reference wavefront 902, the hologram to be defined in the to modulate the reference wave front 902 to output wavefront 904 can be determined numerically using an iterative process. In an embodiment, the iterative process can be implemented by modelling the propagation of energy wave backwards from the output wavefront 904 through the 3D energy medium 602 until a complex amplitude function defined by the hologram in the 3D energy medium 602 results in the a wavefield that is substantially the same as the incident wavefield of the reference wavefront 902. In another embodiment, the iterative process can be implemented by modelling the propagation of incident wavefield of the reference wavefront 902 forward through the 3D energy medium 602 until the output wavefield matches substantially that of the output wavefront 904.

The propagation of a wavefront through the 3D energy medium 602 in any direction may be modeled as a series of wavefield propagations at a series of planes of the 3D energy medium 602. For example, the illustrated embodiment in FIG. 9A shows the 3D energy medium 602 includes 5 planes at z=a, b, c, d, and e, spaced apart by intervals I, II, III, and IV. It is to be appreciated that the number of propagation planes and interval size can vary depending on a variety of factors, such as the physical configuration of the 3D energy medium 602 (i.e., phase boundaries, distribution of particles, etc.), computing power and propagation modeling constraints.

In an embodiment, each propagation plane may correspond to a physical phase boundary (liquid-liquid, liquid-solid, air-liquid, etc.) in the energy medium 602. At each propagation plane, an input wavefield can be determined and propagated to an output wavefield in the next propagation plane using any of the wave propagation formulation and approximations discussed in the present disclosure. For example, a first wavefield 910 at z=a plane can be determined using the reference wave front 902, and the first wave field 910 can be propagated to the a second wavefield 912 at z=b plane using the wave propagation formulation and approximations discussed in the present disclosure. For sequent propagation planes, the second wavefield 912 can be propagated to wavefields 914, 916, and 918 in series. The wavefield 918 at z=e plane would have to match the output wavefront 904. The propagation of the wave field at each propagation plane corresponding to a physical phase boundary may be determined using models that accounts for the effect of surface interactions such as interfacial selectivity. An example of such a model is a transient grating model based on the coupled wave theory. The solutions of this exemplary model have a reflected diffracted field amplitude (eq. 1.27) and a transmitted diffracted field amplitude (eq. 1.28) as provided below:

$$u_1^R = \frac{-i \exp(-ik_{1z}x)}{2} \left[ \frac{A_R}{k_{1x}} \int_{-\infty}^{0} \phi(x')dx' \right. \quad (1.27)$$

$$+ \frac{(A_R)^2}{k_{1x}} \int_{-\infty}^{0} \exp(-2ik_{1x}x')\phi(x')dx'$$

$$+ \frac{1}{k_{1x}} \int_{-\infty}^{0} \exp(+2ik_{1x}x')\phi(x')dx'$$

$$+ \frac{A_T A_T'}{k_{2x}} \int_{0}^{+\infty} \exp(+2ik_{2x}x')\phi(x')dx'$$

$$\left. + \frac{A_R}{k_{1x}} \int_{-\infty}^{0} \phi(x')dx' \right]$$

$$u_1^T = \frac{-iA_T\exp(+ik_{2x}x)}{2} \left[ \frac{1}{k_{1z}} \int_{-\infty}^{0} \phi(x')dx' \right. \quad (1.28)$$

$$+ \frac{1}{k_{2x}} \int_{0}^{+\infty} \phi(x')dx' + \frac{A_R}{k_{1x}} \int_{-\infty}^{0} \exp(-2ik_{1x}x')\phi(x')dx'$$

$$\left. + \frac{-A_R}{k_{2x}} \int_{0}^{+\infty} \exp(+2ik_{2x}x')\phi(x')dx' \right]$$

where $$A_R = \frac{k_{1x} - k_{2x}}{k_{1x} + k_{2x}} = \frac{\sqrt{\epsilon_1}\cos\theta - \sqrt{\epsilon_2}\cos\theta'}{\sqrt{\epsilon_1}\cos\theta + \sqrt{\epsilon_2}\cos\theta'},$$

$$A_T = \frac{2k_{1x}}{k_{1x} + k_{2x}} = \frac{2\sqrt{\epsilon_1}\cos\theta}{\sqrt{\epsilon_1}\cos\theta + \sqrt{\epsilon_2}\cos\theta'}$$

$$A_T' = \frac{2k_{2x}}{k_{1x} + k_{2x}} = \frac{2\sqrt{\epsilon_2}\cos\theta'}{\sqrt{\epsilon_1}\cos\theta + \sqrt{\epsilon_2}\cos\theta'}$$

It is to be appreciated that there are other models are well known in the art and will not be repeated here.

Referring now to FIG. 9B, the propagation of the a wavefield through the 3D energy medium 602' may also account for the interaction of energy wave with a distribution and arrangement of particles in the medium 602'. In an embodiment, energy medium 602' may include particles 902 dispersed therein. The first order scattering for the colloidal sphere 920 at a position $r_p=(x_p, y_p, z_p)$ in medium 602' can be modelled using the following equation:

$$E_1(r, t) = E_0(r_p, t)f_s(k(r - r_p))e^{-\frac{k}{2}(z_p-z)} \quad (1.29)$$

where $f_s(kr)$ is the Lorenz-Mie scattering function describing how a sphere of diameter $d_p$ and refractive index $n_p$ scatters the incident plane wave. Multiple scattering by colloidal particles attenuates the first-order field by an amount that can be modelled by the exponential dependence of the above equation. The above equation can be inserted back into wave equations 1.2 and 1.6 to derive approximated solutions for wavefield propagations through the medium 602' having a specific arrangement and distribution of particles located therein.

It is to be appreciated that the Lorenz-Mie scattering function is a solution to the Maxwell's equations and can be adopted for scattering by any geometries where the radial and angular dependence of the solution can be expressed in separate equations. Some example applications of the Lorenz-Mie scattering function include metamaterials and biological material. It is to be further appreciated that other scattering functions can be used in the modelling of propagating energy wavefield through a colloidal medium, including, for example, the Rayleigh scattering function, unified scattering function, and Rayleigh-Gans approximation. Numerical methods such as the discrete dipole approximation and finite-element methods can also be used. These scattering models and approximations approaches have been described extensively in the art and will not be reproduced here.

In an embodiment, the medium 602' may include both ordered and disordered colloids. For example, a colloidal medium may include first colloidal particles that may be ordered by an energy field created by the energy devices 604 to form an arrangement or distribution, and second colloidal particles that are randomly distributed within the energy medium 602' and operable to affect the amplitude and phase response of a wavefront incident on the 602'. While the energy wave scattered by the ordered colloids may be modelled using the approaches discussed above, the energy wave scattered by disordered colloids can be modelled by considering the joint probability density for the amplitude and/or phase of the scattered wavefield as a Rayleigh distribution. Parameters of disordered colloidal particles that can affect the amplitude and/or phase response may include particle size and the degree of aggregation. An example of the disordered colloids may include, but not limited, to inorganic particles such as gold, silver, copper, element carbon. Other examples include organic materials, inorganic materials, polymeric materials, metallic materials, glass-based materials, composite materials, radioactive materials, microbial materials, and bioluminescent materials.

Referring now to FIG. 9C, the energy medium 602" may include a combination of physical interfaces and particles dispersed therein. The physical interfaces and particles may be modelled using any combination of the above discussed models. In the illustrated example, portions of the energy medium 602" can be modelled in part or in whole as various combination of optical elements (e.g., lens, fresnel lens, etc.).

It is to be appreciated that the propagation models and method discussed above with respect to FIGS. 9A-9C can be implemented to propagate a wavefield start from the z=e plane to the z=a plane or from the z=a plane to the z=e plane.

CGH Modeling of Objects—Point Cloud Method and Polygon Methods

In computer graphic (CG), a 3D object can be described as a collection of modeling primitives such as points, lines, polygons, or surfaces. In an embodiment of the physical interference modeling, for example, a point-cloud based approach may assume the 3D scenes are a collection of point light sources, and spherical waves emitted from these point sources are computed and superposed in the hologram plane. This approach is easy to implement and flexible but is very time consuming for full-parallax CGHs because a large number of point sources are used to describe photo-realistic effects. In an embodiment of the physical interference modeling, a polygon-based approach may consider an object to be a collection of small planar surface light sources that have polygonal shapes, and the wave fields emitted by these polygonal sources are calculated and are superposed in the hologram plane.

Example: Metamaterials

Figure 10A:
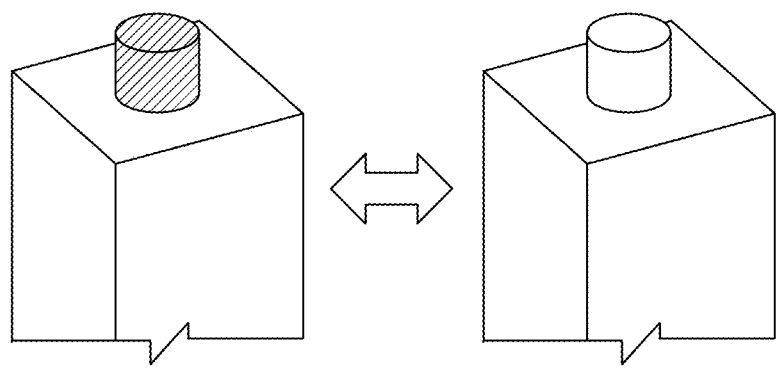
FIG. 10A illustrates an embodiment of metadevices tuned by individual meta-atoms.
Figure 10B:
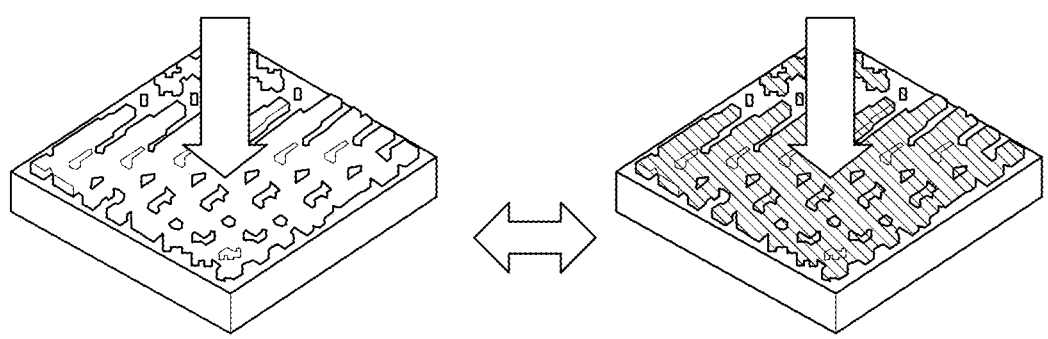
FIG. 10B illustrates an embodiment of metadevices tuned by the collective metasurfaces formed by the meta-atoms.

For example, in an embodiment, the programmable materials may include metamaterials that form reconfigureable metadevices. The metadevices may be tuned by individual meta-atoms as shown in FIG. 10A or by tuning the collective metasurfaces formed by the meta-atoms as shown in FIG. 10B.

In the example where the programmable materials comprise metamaterials that form reconfigurable metadevices, the metadevices may include active metasurfaces. The tuning mechanisms in active metasurfaces at optical frequencies can, in general, be classified into two categories: lattice deformation, where spacing between metaatoms is changed while their individual responses remain unmodified; and meta-atom tuning, where the optical properties of meta-atoms are modulated. In the latter approach, a number of mechanisms can be applied for direct modulation of meta-atom properties, including free carrier injection; thermo-optic, electro-optic, or magneto-optical effects; O-PCMs; electrochemical processes; or optical nonlinearity.

Lattice deformation may be implemented by embedding meta-atoms inside an elastomer matrix. The soft substrate can then withstand large strains, allowing continuous change of meta-atom spacing. Simultaneously, the meta-atoms experience negligible deformation or modification, as they may be made of high-index semiconductors or dielectric materials with elastic moduli several orders of magnitude larger than the elastomer matrix. Many reconfigurable metasurface devices may be designed based on this approach, including metalenses with variable focal lengths, metasurfaces for dynamic coloration, and tunable resonant filters. In addition to facilitating mechanical tuning of optical responses, stretchable metasurfaces may be configured with conformal integration on curvilinear surfaces of traditional refractive or reflective optical elements or coupling with other flexible photonic components to achieve added functionalities. Mechanical actuation of metasurface structures can also be driven by stimuli-responsive materials as an alternative to direct strain exertion. Besides lattice deformation, mechanical tuning of a meta-optical device can be implemented by relative motion of constituent metasurfaces with respect to each other or other optical elements. In this case, the individual metasurfaces can still be passive. For example, the focal length of a microelectromechanical system (MEMS)-tunable metalens can be varied by adjusting the spacing between two metasurfaces. Other examples include tilting of MEMS-integrated metalens for beam steering and relative displacement between metasurface plates for varifocal zoom imaging.

In an embodiment, free carrier accumulation or depletion in conventional semiconductors and transparent conducting oxides (TCOs) induces complex refractive-index change. Free carrier concentration in these materials can be controlled by leveraging optical techniques. However, in some embodiments, the field effect in metal-oxide-semiconductor (MOS) capacitor structures or semiconductor heterojunctions can also be leveraged. The free carrier-induced changes in the refractive index allow for modulating the phase and amplitude of light. In an embodiment, free carrier injection alters band filling in doped materials and shifts the optical absorption edge. This mechanism may be employed to implement tunable plasmonic devices.

While free carrier-based switching methods are versatile and amenable to on-chip integration, the simultaneous occurrence of refractive index and absorption changes may compromise optical efficiency of devices and further introduce undesirable wavefront distortion. Pure index-only modulation can be accomplished through electro-refractive mechanisms. This mechanism of metasurface tuning can be effected with electro-optic materials such as electro-optic polymers, and liquid crystals. In liquid crystals, the birefringent molecules can be reoriented to create a large refractive-index change. In an embodiment, electrical tuning of resonances in plasmonic and dielectric resonator arrays may be effected by immersing metasurface structures in a liquid crystal cell. In an embodiment, metasurface tuning may be effected by thermally switching liquid crystals instead of electrical tuning. For example, heating liquid crystals above a phase transition point may convert from an aligned nematic phase into an isotropic phase with disordered molecular orientations. Optical responses of metasurfaces in contact with liquid crystals can be modulated by changes in refractive index or change in chirality. A major challenge of liquid crystal-based tuning is to separate modulation of phase and amplitude responses. In an embodiment, this problem may be addressed by using transmissive phase-only nanoantennas immersed in a liquid crystal layer. Magnetic field-assisted alignment and photoisomerization are among the other possible switching mechanisms for liquid crystals.

In an embodiment, optical phase-transition and phase-change materials allow for refractive index contrast (with $\Delta n$ usually well-exceeding unity) upon undergoing a solid-state phase transition. Vanadium dioxide (VO2) and chalcogenide compounds, such as Ge—Sb—Te (GST) or Ag—In—Sb—Te (AIST) alloys are some examples that switch between amorphous and crystalline phases. The structural origins of the optical contrast in correlated oxides and chalcogenides are different. The oxides exhibit a Mott-type metal-insulator transition (MIT) where the optical property change is attributable to electron doping. In the chalcogenide phase-change alloys, the refractive index contrast is attributable to a nonvolatile change in the chemical bonding type. The two classes of materials also rely upon distinctive switching methods. In VO2, the MIT is largely volatile but may be possible to control the nucleation kinetics during MIT to engineer the hysteresis loop in VO2 (e.g., via doping), thereby introducing nonvolatile responses over a finite temperature window. The MIT in VO2 can be induced by heating, electric field, terahertz pulses, or optical pumping. In contrast to VO2, the phase transition of chalcogenide O-PCMs is predominantly nonvolatile, and thus requiring actuation only during the active switching process. In an embodiment, the transition between the amorphous and crystalline phases in chalcogenides can be actuated via laser pulses or electrothermal heating with integrated microheaters.

The phase-transition and phase-change materials can enable a wide variety of metasurface devices. VO2 can be applied to the frequency control of plasmonic antenna arrays free-space phase amplitude and polarization modulators, plasmonic color generation, adaptive thermal camouflage, tunable absorbers and emitters, and free-form metadevices. Compared to VO2, chalcogenide O-PCMs exemplified by GST offer even larger optical contrast in the near-IR and UV spectral regimes with an index change up to 2.8. In addition to tuning response of identical meta-atom arrays, advanced active control of metasurface devices, including varifocal metalenses, metasurface color display, spatial light modulators, spectral filters, beam-steering metadevice, reconfigurable holograms, tunable thermal absorbers and emitters, switches, free-form re-writable metasurfaces, and topologically optimized metadevices, have also been experimentally demonstrated leveraging phase-change behavior of GST alloys.

By harnessing the electromagnetic multipoles within tunable meta-atoms, their optical responses can be controlled to precisely tailor the output wavefronts. Turning back to the tuning of metadevices, the operation principles of nonmechanical active metasurfaces can be categorized into two groups: individual meta-atom tuning and collective metasurface tuning. In an embodiment, the individual meta-atom tuning approach as shown in FIG. 10A allows for simplified unit cell designs by leveraging additional DOFs from the switching matrix. Moreover, individual meta-atom modulation in principle enables arbitrary and continuously tunable optical functions for a single device. In an embodiment, instantaneous switching of metasurface patches as schematically illustrated in FIG. 10B can simplify the control process. However, the collective modulation scheme, in some embodiments, can achieve switching between a discrete set of states with predefined, albeit arbitrary, optical functions. One embodiment of this approach is to mix meta-atom subarrays designed for different functions on the same aperture region and selectively turn on/off part of the array to allow optical function switching.

In an embodiment, O-PCMs can be used as either a blanket layer to trigger the mode transitions in metallic structures resting upon them or the building materials of meta-atoms which modulate the transitions directly. In an embodiment, a tunable resonator composed of a gold nanodisk array may be placed on a GST thin layer. The dimensions and periodicity of the gold nanodisks, together with the thickness of the GST layer, can be chosen to achieve a significant resonance shift in the near IR. This resonance shift enabled a large modulation of the transmitted light intensity of around 50% at 2.4-µm wavelength. Apart from GST, this modulation approach can also be achieved with other materials, such as VO2. In an embodiment, a subwavelength gold grating array was deposited on a VO2 film coated on a glass substrate to realize a reconfigurable polarizer.

When O-PCMs are used as the building materials of meta-atoms, different multipole resonances can be excited inside the material during the structural transition, which in turn can be utilized to modulate the amplitude and phase of the incident light. In an embodiment, through harnessing reflection and transmission resonances at specific wavelengths, reconfigurable devices such as multifocus Fresnel zone plates, lenses, and grayscale holograms can be achieved by writing, erasing, and rewriting 2-D binary or grayscale patterns on a GST canvas. More specifically, a continuous relative change of reflectance up to 100% was achieved using excitation laser pulses. In addition to the optical transmission control, the structural transition of GST in patch antennas can also trigger continuous phase-shift modulations, Continuous phase modulation up to $2\pi$ can be achieved by tuning the length of the silver patches.

Similarly, two distinct meta-atoms may be employed to augment the phase coverage. For example, an optical structure may include rectangular-shaped GST nanorods placed on a gold mirror with a spacer layer.

The design principles of phase-profile reconfigurable metasurface optics via collective tuning can be adopted for tuning between arbitrary functionalities via wavefront engineering. Some performance metrics are optical efficiency, contrast ratio, and imaging quality at different optical states. This generic design approach can be used for a variety of meta-atom platforms across different spectral ranges. Assuming N is the number of phase levels covering the $2\pi$ phase range and M is the number of switchable metadevice states, then one would need NM distinct meta-atom designs to realize M arbitrary functionalities. In the simplest-case example, two phase levels (i.e., 0° and 180°) are used to sample the $2\pi$ phase range; a larger number of phase levels are expected to increase the optical efficiency. For transitioning between the two states (e.g., amorphous and crystalline states of the O-PCM), the metasurface design requires a library of four meta-atoms. Each of the selected meta-atoms provides a distinct combination of two phase values corresponding to the O-PCM states. The selected meta-atoms are then subsequently assembled into a 2-D array to generate the desired phase profiles. The meta-atoms can be implemented as all-dielectric Huygens resonators, which feature an ultrathin, deep subwavelength profile that facilitates a simple one-step etching fabrication process. Other types of metasurfaces (e.g., truncated waveguide or geometric-phase antenna) can be utilized as well using the same design framework.

Example: Nanoparticles

In another example, the programmable materials comprise nanoparticles operable to be directed for self assembly. Directed self assembly (DSA) may be implemented with templated, template-free, and external field-directed techniques. External field directed techniques employ a set of transducers to generate an electric, magnetic, or ultrasound field that acts as a tunable mask, and enables modifying a pattern of nanoparticles by adjusting the arrangement and operating parameters of the transducer(s). Ultrasound DSA relies on the acoustic radiation force associated with an ultrasound wave field to organize nanoparticles into a hologram.

However, using ultrasound DSA involves relating the ultrasound transducer arrangement and parameters that generate the ultrasound wave field to the resulting pattern of nanoparticles that is assembled, as specified a priori by the pattern designer. This translates into two problems: (1) the "forward ultrasound DSA problem" entails calculating the pattern of nanoparticles resulting from ultrasound transducer parameters, and (2) the "inverse ultrasound DSA problem" involves calculating the ultrasound transducer parameters required to assemble the nanoparticles to desired locations to modulate a wavefield. Solving the forward ultrasound DSA problem may involve computing the acoustic radiation force associated with the ultrasound wave field generated by the ultrasound transducers. The resulting pattern of nanoparticles is then found as the stable fixed positions xf of the acoustic radiation force, i.e., the location(s) where the force is zero and points toward xfin the surrounding region. The inverse ultrasound DSA problem is solved either directly or indirectly. Indirect methods solve the forward ultrasound DSA problem for a range of ultrasound transducer parameters and create a "map" tha relates nanoparticle patterns to transducer parameters.

The pattern of nanoparticles to the ultrasound transducer parameters may be effected in two steps. First, the ultrasound wave field may be calculated for an arbitrary shaped reservoir lined with ultrasound transducers around its perimeter as a function of the ultrasound transducer parameters using the boundary element method based on Green's third identity, which relates the wave field within a simply closed domain to the boundary conditions imposed on the perimeter of that domain. Then, the acoustic radiation force acting on a spherical particle is calculated to determine the pattern of nanoparticles resulting from the ultrasound wave field. Finally, the ultrasound transducer parameters required to assemble the nanoparticles in desired location to modulation a wavefield can be determined by solving a constrained nonconvex quadratic optimization problem using eigendecomposition.

Figure 11:
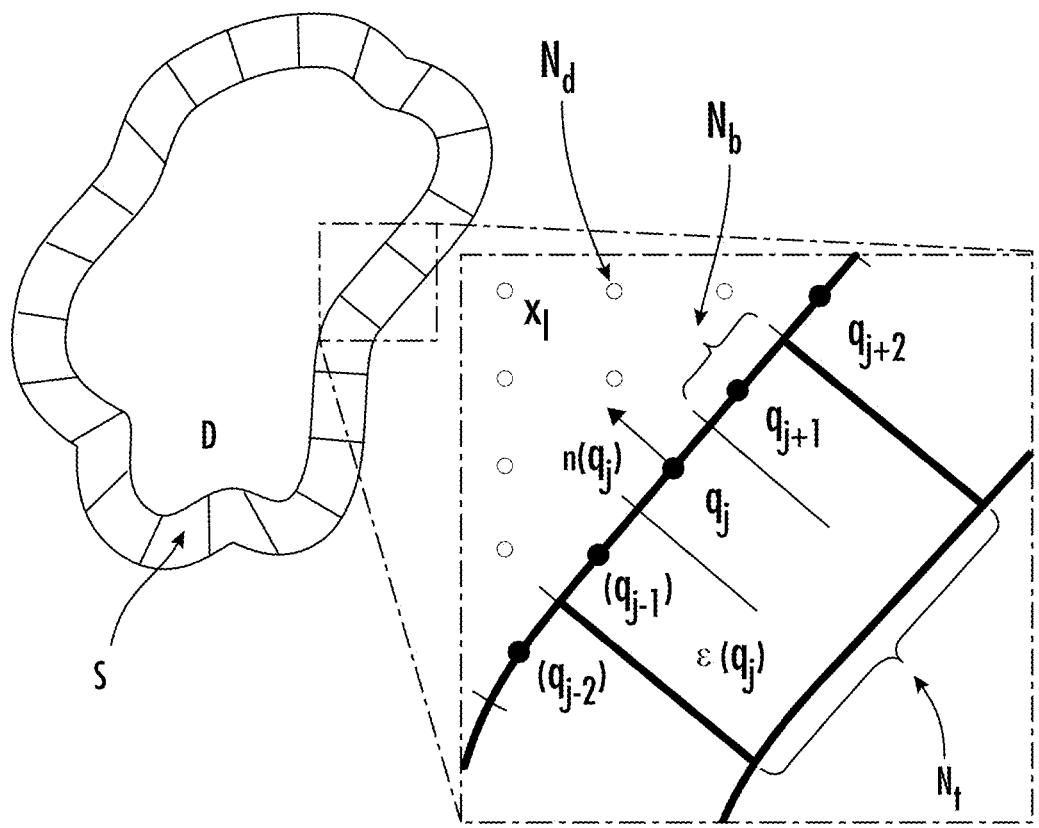
FIG. 11, illustrates the discretization of the domain perimeter S.

FIG. 11 shows a two-dimensional arbitrary shaped reservoir filled with a fluid medium of density $\rho_m$ and sound speed $c_m$, and lined with $N_t$ ultrasound transducers of acoustic impedance $Z_t$ around the perimeter. FIG. 11 illustrates the discretization of the domain perimeter S into $N_b > N_t$ boundary elements and the domain D into $N_d$ domain points, which may be selected in any arrangement. The $j^{th}$ boundary element, identified by its center point $q_j$ is $\varepsilon(q_j)$ wide and is driven by the ultrasound transducer parameter $v(q_j)$, i.e., the complex harmonic velocity (amplitude and phase) of the transducer surface along its normal direction $n(q_j)$, which acts as a piston source to create the ultrasound wave field. Additionally, an arbitrary point $X_l$ is located in the domain D and has reservoir coordinates (x, y).

Using a boundary element method, a ultrasound wave field with frequency $\omega_0$ can be determined in terms of a time-independent, complex scalar velocity potential $\varphi$ at each domain point within D. One of the constrains for solving the ultrasound wave field is that $\varphi$ must satisfy the Helmholtz equation $\nabla^2 \varphi + k_0^2 \varphi = 0$ in D where $k_0$ is the wave number of the ultrasound wave field in the fluid medium. Additionally, the impedance boundary condition $\partial \varphi / \partial n + ik_0 Z \varphi = v$ must be satisfied on S, where $Z_r = \rho_m c_m / Z_t$ is the impedance ratio, accounting for the absorption and reflection of the ultrasound wave within the fluid medium as it interacts with the ultrasound transducer surface.

Arranging all ultrasound transducer parameters $v(q_j)$ into a vector v, we calculate the ultrasound wave field at all $N_d$ domain points using equation (1.30):

$$\varphi = PWv \quad (1.30)$$

Where W is a matrix that maps boundary element to its corresponding ultrasound transducer, i.e., $w_{jn}=1$ if the $j^{th}$ boundary element is contained within the $n^{th}$ transducer, otherwise $w_{jn}=0$. Additionally, each term $p_{ij}$ of the matrix P corresponds to the ultrasound wave field created at $x_l$ by a point source located at $q_j$ on S, including all reflections from the reservoir walls. As well known in the art, all $p_{ij}$ terms can be calculated in matrix form using the Green's function to represent the free-field ultrasound wave emitted from a point source located at $q_j$ and measured at location $x_l$.

The above correlates the ultrasound transducer parameters to the resulting ultrasound wave field. To correlate the ultrasound wave field to the pattern of nanoparticles, the acoustic radiation force action $f_1$ on a nanoparticle of density $\rho_p$ and sound speed $c_p$, dispersed in a fluid medium at location $x_l$ can be determined using equation 1.31:

$$f_l = -\nabla U_l \quad (1.31)$$

where $U_l$ is the acoustic radiation potential at $x_l$. In an embodiment, the nanoparticles can be assumed to be a spherical particle with radius $\rho_p << \lambda_0 = 2\pi c_m / w_0$. As such, $U_l$ can be determined using equation 1.32 below:

$$U_l = v^H Q_l v \quad (1.32)$$

Where $v^H$ is the conjugate transpose of v, and the Hermitian matrix Q can be expressed as equation 1.33:

$$Q_l = 2\pi r_p^3 \rho_m W^H \left\{ \frac{1}{3} k_0^2 \left[ 1 - \left(\frac{\beta_p}{\beta_m}\right)^2 \right] [p_l p_l^H] - \left[\frac{\rho_p - \rho_m}{2\rho_p + \rho_m}\right] [(\nabla p_l)(\nabla p_l)^H] \right\} W. \quad (1.33)$$

where $p^H$ is the $l^{th}$ row of P, and $\beta_m$ and $\beta_p$ are the compressibility of the fluid medium and particle, respectively. Equation 1.32 allows for determination of the pattern of nanoparticles based on points $x_l$ that $U_l$ is locally minimum. In other words, an assembly of a desired arrangement of nanoparticles would be the set of desired positions $X_{des}$ with each value $U_l$ corresponding to each position $x_l \in X_{des}$ being locally minimum with respect to the reservoir coordinates (x,y). Physically, this means that particles assemble at the desired positions more effectively by increasing the harmonic velocity amplitude of the ultrasound transducer surfaces. Practically, the function generator that energizes the ultrasound transducers limits the harmonic velocity amplitude of the transducer surfaces to finite values. Thus, we constrain the magnitude $|v| = \alpha$ where $\alpha$ is a real, scalar value representing the maximum harmonic velocity of the ultrasound transducer surface that can be achieved with a function generator. As such, the ultrasound transducer parameters v* for assembling an arrangement of nanoparticles can be determined as the eigenvector corresponding to the smallest eigenvalue of Q, where v* has length $\alpha$.

The above illustrated approach of arrange nanoparticles dispersed in a fluid medium can be generalized and applied to arrange any colloid dispersed in any fluid medium to thereby modulate an incident wavefield and generate a wavefield according to the CGH approaches discussed in the present disclosure.

Example embodiments will now be described hereinafter with reference to the accompanying drawings, which form a part hereof, and which illustrate example embodiments which may be practiced. As used in the disclosures and the appended claims, the terms "embodiment", "example embodiment", and "exemplary embodiment" do not necessarily refer to a single embodiment, although they may, and various example embodiments may be readily combined and interchanged, without departing from the scope or spirit of example embodiments. Furthermore, the terminology as used herein is for the purpose of describing example embodiments only and is not intended to be limitations. In this respect, as used herein, the term "in" may include "in" and "on", and the terms "a," "an" and "the" may include singular and plural references. Furthermore, as used herein, the term "by" may also mean "from", depending on the context. Furthermore, as used herein, the term "if" may also mean "when" or "upon," depending on the context. Furthermore, as used herein, the words "and/or" may refer to and encompass any and all possible combinations of one or more of the associated listed items.

While various embodiments in accordance with the principles disclosed herein have been described above, it should be understood that they have been presented by way of example only, and are not limiting. Thus, the breadth and scope of the invention(s) should not be limited by any of the above-described exemplary embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

It will be understood that the principal features of this disclosure can be employed in various embodiments without departing from the scope of the disclosure. Those skilled in the art will recognize, or be able to ascertain using no more than routine experimentation, numerous equivalents to the specific procedures described herein. Such equivalents are considered to be within the scope of this disclosure and are covered by the claims.

Additionally, the section headings herein are provided for consistency with the suggestions under 37 CFR 1.77 or otherwise to provide organizational cues. These headings shall not limit or characterize the invention(s) set out in any claims that may issue from this disclosure. Specifically, and by way of example, although the headings refer to a "Field of Invention," such claims should not be limited by the language under this heading to describe the so-called technical field. Further, a description of technology in the "Background of the Invention" section is not to be construed as an admission that technology is prior art to any invention(s) in this disclosure. Neither is the "Summary" to be considered a characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings set forth herein.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects. In general, but subject to the preceding discussion, a numerical value herein that is modified by a word of approximation such as "about" may vary from the stated value by at least 1, 2, 3, 4, 5, 6, 7, 10, 12 or 15%.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

Words of comparison, measurement, and timing such as "at the time," "equivalent," "during," "complete," and the like should be understood to mean "substantially at the time," "substantially equivalent," "substantially during," "substantially complete," etc., where "substantially" means that such comparisons, measurements, and timings are practicable to accomplish the implicitly or expressly stated desired result. Words relating to relative position of elements such as "near," "proximate to," and "adjacent to" shall mean sufficiently close to have a material effect upon the respective system element interactions. Other words of approximation similarly refer to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skilled in the art recognize the modified feature as still having the desired characteristics and capabilities of the unmodified feature.

The term "or combinations thereof" as used herein refers to all permutations and combinations of the listed items preceding the term. For example, "A, B, C, or combinations thereof is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

All of the compositions and/or methods disclosed and claimed herein can be made and executed without undue experimentation in light of the present disclosure. While the compositions and methods of this disclosure have been described in terms of preferred embodiments, it will be apparent to those of skill in the art that variations may be applied to the compositions and/or methods and in the steps or in the sequence of steps of the method described herein without departing from the concept, spirit and scope of the disclosure. All such similar substitutes and modifications apparent to those skilled in the art are deemed to be within the spirit, scope and concept of the disclosure as defined by the appended claims.

What is claimed is:

1. A holographic energy system, comprising
a continuous three-dimensional energy medium;
an array of energy devices configured to output first energy operable to modify the continuous three-dimensional energy medium to define a hologram therein;
an electromagnetic energy source operable to output coherent EM energy to the continuous three-dimensional energy medium;
a controller operable to provide an instruction to the array of energy devices so that the hologram defined in the continuous three-dimensional energy medium modulates the coherent electromagnetic energy according to a complex amplitude function to generate a wavefront having a complex amplitude;

wherein the controller is further operable to dynamically update the instruction to the array of energy devices to update the hologram defined in the continuous three-dimensional energy medium to modulate the coherent electromagnetic Energy according to an updated complex amplitude function to generate a dynamically updated wavefront;

wherein the continuous three-dimensional energy medium comprises first and second immiscible phases;

wherein the first immiscible phase forms a first dispersion medium and the second immiscible phase forms a first dispersed phase in the first dispersion medium;

wherein the continuous three-dimensional energy medium comprises a third phase immiscible with the first and second immiscible phases of the continuous three-dimensional energy medium, wherein the third phase of the continuous three-dimensional energy medium forms a second dispersed medium; and wherein the first dispersed phase is not dispersed in the third phase, and the continuous three-dimensional energy medium comprises a fourth phase immiscible with the first, second, and third phases of the continuous three-dimensional energy medium, and the fourth phase forms a second dispersed phase that is dispersed in the second dispersed medium.

2. The holographic energy system of claim 1, wherein the first dispersed phase and the first dispersion medium define a first colloid wherein the first dispersed phase substantially does not settle.

3. The holographic energy system of claim 1, wherein the first dispersed phase and the first dispersion medium define a first suspension.

4. The holographic energy system of claim 1, wherein the first dispersion medium comprises a solid, liquid, or gaseous substance.

5. The holographic energy system of claim 1, wherein the first dispersed phase comprises a solid, liquid, or gaseous substance.

6. The holographic energy system of claim 1, wherein the first dispersion medium and the first dispersed phase form a liquid aerosol, a solid aerosol, a liquid foam, a solid foam, an emulsion, a gel, a liquid-solid sol, or a solid-solid sol.

7. The holographic energy system of claim 1, wherein the first dispersed phase comprises programmable materials, wherein the first energy is operable to interact with the programmable materials to change at least one property of the programmable materials.

8. The holographic energy system of claim 7, where the at least one property comprises a collective property of the programmable materials.

9. The holographic energy system of claim 7, where the at least one property comprises a localized property of the programmable materials.

10. The holographic energy system of claim 7, wherein the programmable materials comprise metamaterials, and the metamaterials form reconfigurable metadevices.

11. The holographic energy system of claim 10, wherein the metadevices comprise active metasurfaces.

12. The holographic energy system of claim 11, wherein the active metasurfaces comprise optical phase-change materials.

13. The holographic energy system of claim 11, wherein the active metasurfaces comprises a deformable lattice structure.

14. The holographic energy system of claim 13, the active metasurfaces comprise meta-atoms in a flexible substrate, wherein the meta-atoms comprises high-index materials with elastic moduli larger than that of the flexible substrate.

15. The holographic energy system of claim 14, wherein a spacing of the meta-atoms is configured to be tuned by a mechanical force exerted directly or indirectly on the metasurfaces.

16. The holographic energy system of claim 13, wherein a spacing of the meta-atoms is configured to be tuned by an energy provided to the metasurfaces.

17. The holographic energy system of claim 1, wherein the third phase of the continuous three-dimensional energy medium comprises a homogenous phase.

18. The holographic energy system of claim 1, wherein the first dispersed phase is dispersed in the second dispersed medium.

19. The holographic energy system of claim 1, wherein the second dispersed phase is dispersed in the first dispersed medium.

20. The holographic energy system of claim 1, wherein the second dispersed phase is not dispersed in the first dispersed medium.

21. The holographic energy system of claim 1, wherein the first and second immiscible phases define a conformal, programmable interface therebetween.

22. The holographic energy system of claim 21, wherein at least one of the first and second immiscible phases comprises a programmable liquid metal.

23. The holographic energy system of claim 22, wherein a morphology of the programmable liquid metal is operable to be altered due to interaction with the first energy.

24. The holographic energy system of claim 22, wherein the other one of the first and second immiscible phase comprises a tunable optical element.

25. The holographic energy system of claim 1, wherein the first energy comprises an applied magnetic field.

* * * * *